United States Patent
Boenapalli et al.

(10) Patent No.: US 12,346,592 B2
(45) Date of Patent: Jul. 1, 2025

(54) WRITE THROUGHPUT IMPROVEMENT OF FLASH MEMORY DEVICE

(71) Applicant: QUALCOMM Incorporated, San Diego, CA (US)

(72) Inventors: Madhu Yashwanth Boenapalli, Hyderabad (IN); Sai Praneeth Sreeram, Anantapur (IN); Surendra Paravada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 18/472,959

(22) Filed: Sep. 22, 2023

(65) Prior Publication Data

US 2025/0103232 A1    Mar. 27, 2025

(51) Int. Cl.
*G06F 3/06* (2006.01)
*G06F 12/02* (2006.01)

(52) U.S. Cl.
CPC .......... *G06F 3/0647* (2013.01); *G06F 3/0613* (2013.01); *G06F 3/0619* (2013.01); *G06F 3/0679* (2013.01); *G06F 12/0246* (2013.01); *G06F 2212/7208* (2013.01)

(58) Field of Classification Search
CPC .... G06F 3/0647; G06F 3/0613; G06F 3/0619; G06F 3/0679; G06F 12/0246; G06F 2212/7208
See application file for complete search history.

(56) References Cited

U.S. PATENT DOCUMENTS

| | | | | |
|---|---|---|---|---|
| 9,710,377 | B1* | 7/2017 | Kuzmin | G06F 8/654 |
| 12,014,061 | B2* | 6/2024 | Trimble | G06F 3/067 |
| 2016/0062677 | A1 | 3/2016 | Samuels et al. | |
| 2016/0070483 | A1* | 3/2016 | Yoon | G06F 13/1694 |
| | | | | 711/154 |
| 2018/0173434 | A1* | 6/2018 | Li | G06F 13/4282 |
| 2018/0232181 | A1* | 8/2018 | Zhou | G06F 3/0604 |
| 2019/0042106 | A1 | 2/2019 | Klein et al. | |
| 2019/0065093 | A1 | 2/2019 | Karr et al. | |
| 2020/0233605 | A1* | 7/2020 | Boenapalli | G11C 16/3418 |
| 2023/0018707 | A1* | 1/2023 | More | G06F 3/064 |
| 2023/0393779 | A1* | 12/2023 | Kane | G06F 3/0604 |
| 2024/0053900 | A1* | 2/2024 | Vaghasiya | G06F 3/0616 |

OTHER PUBLICATIONS

International Search Report and Written Opinion—PCT/US2024/040212—ISA/EPO—Oct. 8, 2024.

* cited by examiner

*Primary Examiner* — Curtis James Kortman
(74) *Attorney, Agent, or Firm* — Moore IP/QUALCOMM

(57) ABSTRACT

A host device includes a memory configured to store a logical-to-physical address mapping table of a flash memory device. The host device also includes one or more processors coupled to the memory and configured to be coupled to the flash memory device. The one or more processors are configured to determine whether a trigger condition is satisfied. The trigger condition is associated with checking a distribution of write data that is written to the flash memory device. The one or more processors are also configured to, based on a determination that the trigger condition is satisfied, identify a die of the flash memory device that has a higher data occupancy than at least one other die of the flash memory device, and send a command to the flash memory device to move data from the identified die to one or more other dies of the flash memory device.

30 Claims, 10 Drawing Sheets

WRITE THROUGHPUT IMPROVEMENT OF FLASH MEMORY DEVICE

I. FIELD

The present disclosure is generally related to improvement in write throughput to a flash memory device.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to operate as a host device that can store and retrieve data from a flash memory device. Flash memory devices, such as Universal Flash Storage (UFS) devices and other NAND flash-based storage memory devices (such as NVM Express (NVMe) solid-state drives (SSDs)) typically use two or more NAND flash memory dies to maximize performance. NAND flash memory array access, such as to read data from the flash memory array and/or write data to the flash memory array, takes significantly longer than data transfer to or from the controller of the flash memory device. To illustrate, accessing 8 kilobytes (KB) of data from a flash memory array can take about 70 microseconds (us) when read from the memory array, and writing 8 KB of data to the flash memory array can take about 800 us, whereas transferring 8 KB of data from/to the controller at 800 megabytes per second (MB/s) takes about 10 us.

The number of memory dies in a flash memory device can vary depending on the capacity and form factor of the flash memory device and can range from a single memory die to several hundred memory dies. A single memory die in a flash memory device can have a capacity of a few gigabytes in some examples, and multiple dies can be combined in a package to increase the total capacity. The number of dies in a flash memory device can impact the performance and reliability of the NAND memory device, as well as its cost and physical size. Using multiple dies in conjunction with a logical-to-physical (L2P) address mapping table, which maps logical block addresses (LBAs) (e.g., file system addresses used at the host device) to physical block addresses (PBAs), enables a flash memory device to spread sequential write data associated with contiguous logical block addresses (LBAs) across multiple dies in parallel, increasing overall write throughput of the flash memory device as compared to serially storing the write data into a single die.

However, due to heavy sequential write operations, there is a possibility that all the data is written to contiguous LBAs is located in the same die, which might exhaust the storage capacity of the die, resulting in write performance degradation.

III. SUMMARY

According to one implementation of the present disclosure, a host device includes a memory configured to store a logical-to-physical address mapping table of a flash memory device. The host device also includes one or more processors coupled to the memory and configured to be coupled to the flash memory device. The one or more processors are configured to determine whether a trigger condition is satisfied. The trigger condition is associated with checking a distribution of write data that is written to the flash memory device. The one or more processors are also configured to, based on a determination that the trigger condition is satisfied, identify a die of the flash memory device that has a higher data occupancy than at least one other die of the flash memory device, and send a command to the flash memory device to move data from the identified die to one or more other dies of the flash memory device.

According to another implementation of the present disclosure, a method includes, at a host device coupled to a flash memory device, determining whether a trigger condition is satisfied. The trigger condition is associated with checking a distribution of write data that is written to the flash memory device. The method also includes, based on determining that the trigger condition is satisfied, identifying a die of the flash memory device that has a higher data occupancy than at least one other die of the flash memory device, and sending a command to the flash memory device to move data from the identified die to one or more other dies of the flash memory device.

According to another implementation of the present disclosure, a non-transitory computer-readable medium stores instructions that, when executed by one or more processors of a host device coupled to a flash memory device, cause the one or more processors to determine whether a trigger condition is satisfied. The trigger condition is associated with checking a distribution of write data that is written to the flash memory device. The instructions further cause the one or more processors to, based on a determination that the trigger condition is satisfied, identify a die of the flash memory device that has a higher data occupancy than at least one other die of the flash memory device, and send a command to the flash memory device to move data from the identified die to one or more other dies of the flash memory device.

According to another implementation of the present disclosure, an apparatus includes means for determining whether a trigger condition is satisfied. The trigger condition is associated with checking a distribution of write data that is written to a flash memory device. The apparatus includes means for identifying, based on determining that the trigger condition is satisfied, a die of the flash memory device that has a higher data occupancy than at least one other die of the flash memory device. The apparatus also includes means for sending a command to the flash memory device to move data from the identified die to one or more other dies of the flash memory device.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Systems and methods of improving write throughput of a flash memory device are disclosed. Using multiple dies in a flash memory device enables higher write throughput by spreading write data across the multiple dies as compared to storing all write data to a single die; however, due to heavy sequential write operations, there is a possibility that all the data written to contiguous LBAs is instead located in the same die, which can result in write performance degradation.

The systems and techniques described herein provide solutions for improving write throughput of a flash memory device that has multiple dies. As used herein, a "die" refers to a memory die (e.g., a NAND flash memory die) of a flash memory device. In an example, a host device can detect a trigger condition associated with checking a distribution of write data that is written to the flash memory device. To illustrate, the host device may determine that, after performing a series of data write operations to the flash memory device, the write data was not evenly distributed among the dies of the flash memory device.

In response to detecting the trigger condition, the host device can enter a host write monitoring mode. According to an aspect, in the host write monitoring mode, the host device identifies a die of the flash memory device that has a higher data occupancy than at least one other die of the flash memory device. The host device sends a command to the flash memory device to move data from the identified die to one or more other dies of the flash memory device. The movement of the data from the identified die to the one or more other dies more evenly distributes stored data across the dies of the flash memory device, which improves subsequent write throughput via more even distribution of write data across multiple dies of the flash memory device.

The disclosed techniques thus help to recover write performance at a multi-die flash memory device even if any of the dies stores unevenly fragmented data or is exhausted, allowing the system to restore and achieve desired key performance indicators (KPIs) such as write throughput. By utilizing dies in the flash memory more effectively, write KPIs can be improved.

Figure 1:
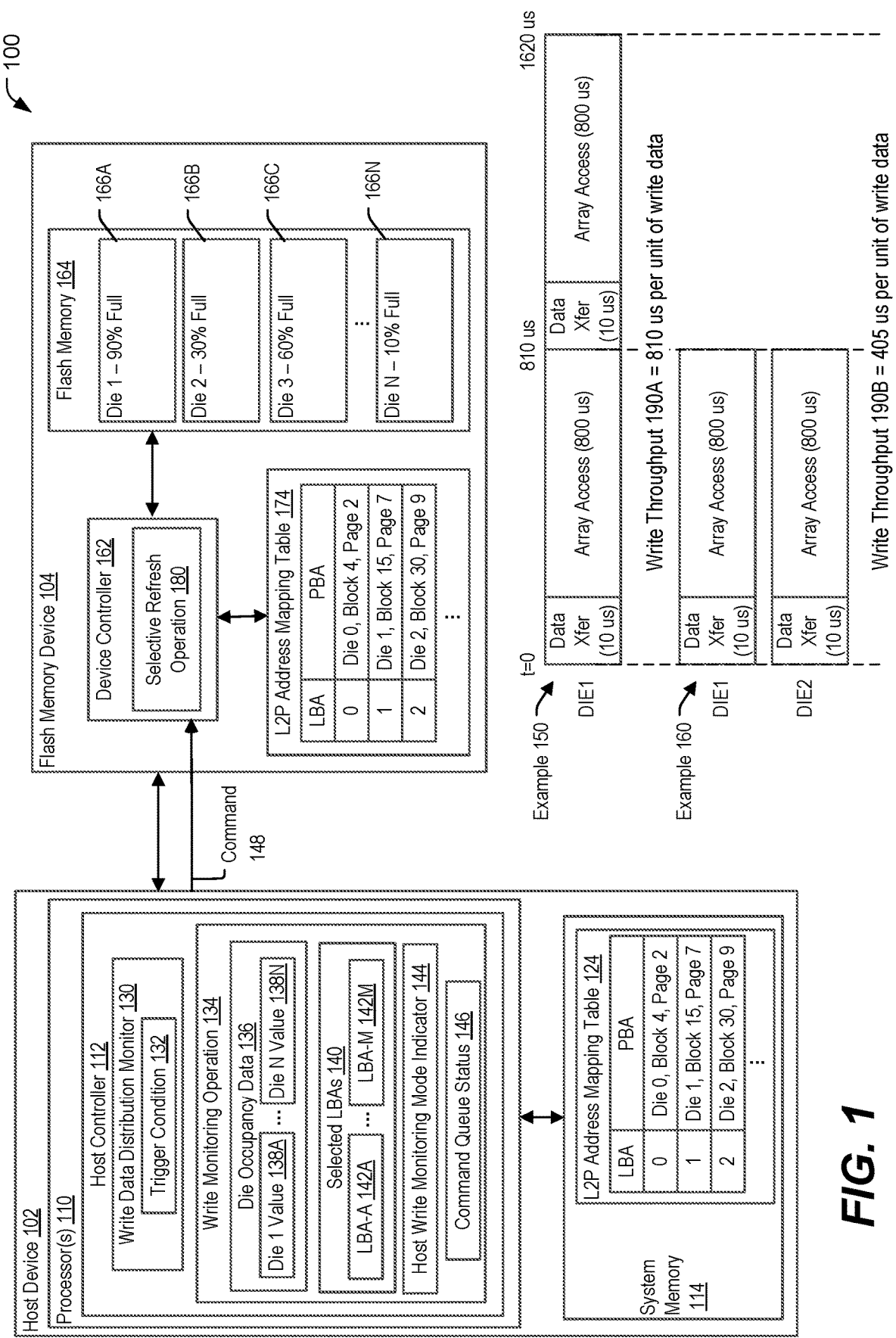
FIG. 1 is a block diagram of a particular illustrative aspect of a system operable to improve write throughput of a flash memory device, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a host device 102 including one or more processors ("processor(s)" 110 of FIG. 1), which indicates that in some implementations the host device 102 includes a single processor 110 and in other implementations the host device 102 includes multiple processors 110. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple dies are illustrated and associated with reference numbers 166A, 166B, 166C, and 166N. When referring to a particular one of these dies, such as a die 166A, the distinguishing letter "A" is used. However, when referring to any arbitrary one of these dies or to these dies as a group, the reference number 166 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/ or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect is shown of a system 100 that is configured to improve write throughput of a flash memory device. The system 100 includes a host device 102 coupled to a flash memory device 104.

The flash memory device 104 includes a device controller 162, an L2P address mapping table 174, and a flash memory 164 (e.g., NAND memory) that includes N dies 166A-166N. Although examples are presented herein in which the flash memory device 104 includes four dies 166 (i.e., N=4), it should be understood that in general, N can be any integer greater than 1 (e.g., 2, 3, 10, 20, 100, etc.). The L2P address mapping table 174 is configured to include mappings between logical memory addresses, illustrated as logical block addresses (LBAs), and physical memory addresses, illustrated as physical block addresses (PBAs) of the flash memory 164.

The host device 102 includes one or more processors 110 that include a host controller 112 and that are coupled to a system memory 114 (e.g., a system-on-chip (SOC) dynamic random access memory (DRAM)). The system memory 114 includes an L2P address mapping table 124 that is synchronized to match the L2P address mapping table 174 at the flash memory device 104. The host controller 112 is configured to be coupled to the flash memory device 104 and to communicate with the device controller 162 of the flash memory device 104. According to some implementations, the host controller 112 is configured to send one or more commands to the device controller 162, and the device controller 162 is configured to send a response to a command received from the host controller 112.

The host controller 112 includes a write data distribution monitor 130 that is configured to determine when a trigger condition 132 is satisfied. The trigger condition 132 is associated with checking a distribution of write data that is written to the flash memory device 104. For example, after completion of a sequence of data write operations, the write data distribution monitor 130 may check, based on response information from the flash memory device 104, whether the data was written evenly across the multiple dies 166. The trigger condition 132 being satisfied indicates that, after completion of a sequence of data write operations to the flash memory device 104, the write data was not evenly distributed among the dies 166 of the flash memory device 104.

Figure 3:
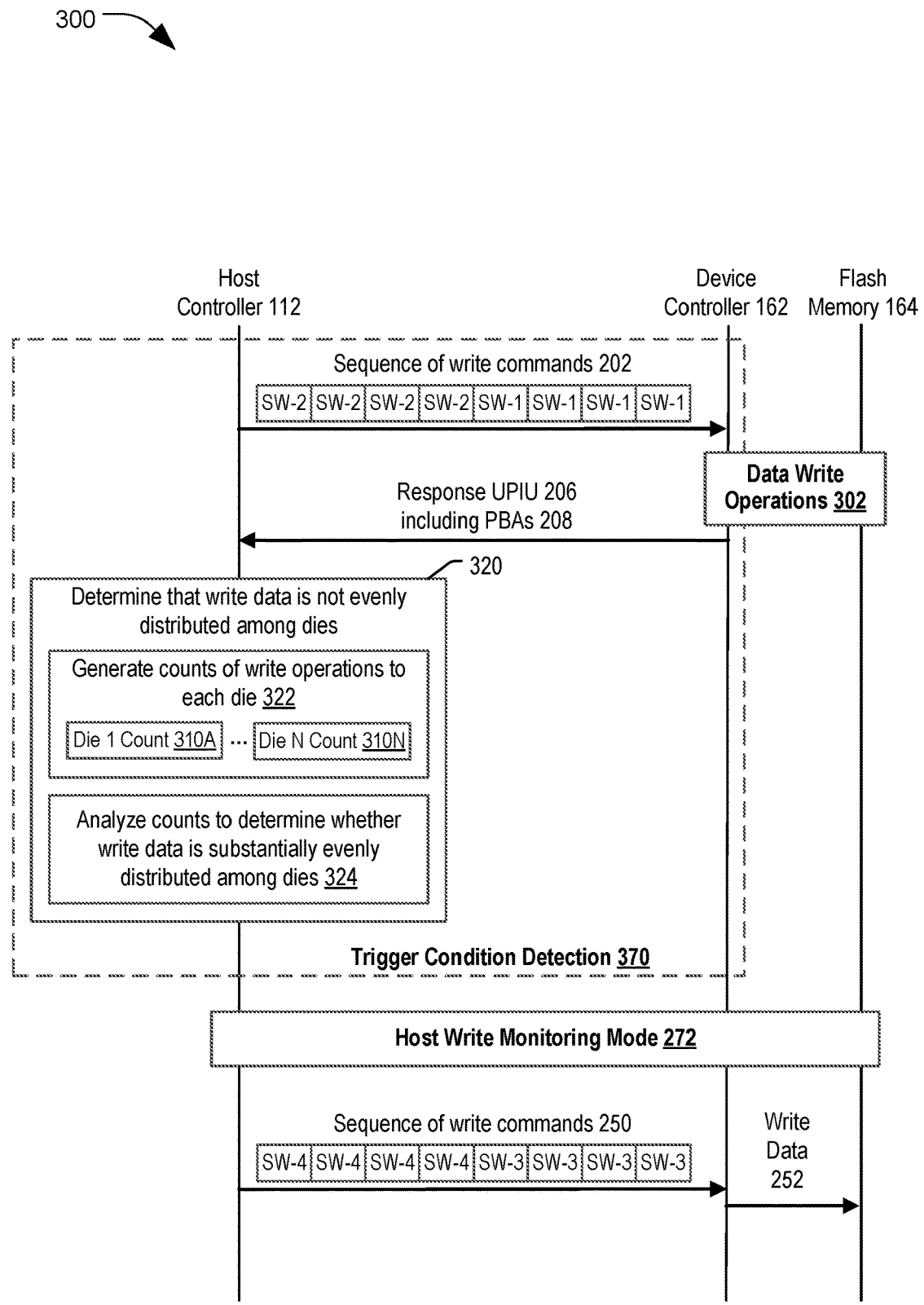
FIG. 3 is a ladder diagram of another illustrative aspect of operations to improve write throughput of a flash memory device, in accordance with some examples of the present disclosure.

To illustrate, the write data distribution monitor 130 may maintain counts of write operations to each respective destination die 166 and determine if the differences in the counts indicate an uneven distribution of the write data among the dies 166, such as described further with reference to FIG. 3. Other examples of determining that the trigger condition 132 is satisfied can be based on whether a count of write operations to a single die exceeds a threshold count (e.g., over a particular time interval), such as described further with reference to FIG. 4, based on whether the time that it takes to perform sequential write operations exceeds a threshold time (e.g., indicating serial writing of data to a single die instead of parallel writing of the data to multiple dies), such as described further with reference to FIG. 5, based on whether an elapsed time since a previous die occupancy detection operation was performed exceeds a threshold time interval, such as described further with reference to FIG. 6, or any combination thereof, as illustrative, non-limiting examples.

The host controller 112 is configured to initiate a host write monitoring mode based on determining that the trigger condition 132 is satisfied. For example, based on determining that the trigger condition 132 is satisfied, the host controller 112 can set an indicator 144 of the host write monitoring mode, such as a host flag in a command header sent to the flash memory device 104, as described further with reference to FIG. 2.

In the host write monitoring mode, the host controller 112 is configured to perform a write monitoring operation 134 that includes determining die occupancy data 136. In a particular implementation, the die occupancy data 136 includes a data occupancy value 138 for each of the dies 166. For example, because the L2P address mapping table 124 includes die information associated with each LBA of data stored in the flash memory 164, the host controller 112 can generate a data occupancy value 138 of each die 166 based on physical addresses in the L2P address mapping table 124. To illustrate, the data occupancy values 138A-138N can indicate that the first die 166A is 90% full, the second die 166B is 30% full, the third die 166C is 60% full, and the Nth die 166N is 10% full. Note that particular data occupancy values are provided as illustrative non-limiting examples, in other examples one or more of the data occupancy values can be different.

Also during the host write monitoring mode, the host controller 112 is configured to identify a die 166 of the flash memory device 104 that has a higher data occupancy value 138 than at least one other die 166 of the flash memory device 104, and send a command 148 to the flash memory device 104 to move data from the identified die 166 to one or more other dies of the flash memory device 104. For example, the write monitoring operation 134 can include accessing the data occupancy values 138A-138N to identify that the first die 166A has the highest data occupancy of the dies 166.

According to an aspect, the command 148 is a refresh command that corresponds to a selective refresh operation 180 supported by the flash memory device 104, and the host device 102 is configured to send LBAs 142 associated with the data to be moved in conjunction with the command 148. For example, the write monitoring operation 134 can include determining a set of one or more selected LBAs 140. The set of selected LBAs 140 can include a first range of LBAs (LBA-A) 142A and one or more other ranges of LBAs, including an Mth range of LBAs (LBA-M) 142M, where M is a positive integer.

The command 148 may be sent responsive to detection of an idle condition associated with the flash memory device 104. For example, the host device 102 may determine a command queue status 146 to detect the idle condition based on one or more operative command queues being empty, and may send the command 148 during the idle condition to prevent the selective refresh operation 180 from interfering with execution of pending commands (e.g., read or write commands) for the flash memory device 104.

After the host device 102 sends the command 148 to the device controller 162, the device controller 162 performs the selective refresh operation 180, which includes moving data corresponding to the selected LBAs 140 to other dies 166 of the flash memory 164. The host device 102 is configured to receive, from the flash memory device 104, updated physical block addresses that are associated with the selected LBAs 140 and that are sent by the device controller 162 after movement of the data to new physical addresses at one or more destination dies 166 of the flash memory device 104. The host device 102 is configured to update the L2P address mapping table 124 based on the updated physical block addresses.

Movement of the data from the identified die 166A to the one or more other dies 166 improves write throughput via increasing the distribution of sequential write data across multiple dies 166 of the flash memory device 104. To illustrate, spreading data from the most occupied die(s) to other dies increases the likelihood that subsequent sequential write operations will spread the write data across multiple dies rather than sequentially writing the data to a single die, and therefore increases write throughput. As illustrated in a first example 150 in FIG. 1, a data write operation to write a unit of data (e.g., a page) to a die includes data transfer (e.g., 10 us) and an array access (e.g. 800 us), totaling 810 us. Two sequential writes to the same die (e.g., the first die 166A) therefore take 1620 us, resulting in a write throughput 190A of 810 us per unit of write data. However, as illustrated in a second example 160, spreading the write data across multiple dies enables the write operations to be performed in parallel, so that both data writes are completed in 810 us, resulting in a write throughput 190B of 405 us per unit of write data, which is twice the write throughput 190A of the first example 150.

In general, the write throughput 190 increases with the number of dies 166 that are available for write operations and is inversely related to the write latency. In an illustrative example, the latency to write "X" requests to a single die (X is a positive integer) is determined by the expression A*X, where "A" is the latency associated with writing a single request (e.g., 810 us) and "*" indicates multiplication. The latency to write X requests that are evenly distributed across two dies is determined by the expression A*X/2, and the latency to write X requests that are evenly distributed across N dies is determined by the expression A*X/N. As an illustrative, non-limiting general approximation in which X=2 and A=800 us, write throughput can be enhanced due to reduction of write latency according to the expression (1600 us)/N, where N is the number of available dies.

The host device 102 detecting that the trigger condition 132 indicates an uneven distribution of stored data across the dies 166 of the flash memory device 104, and sending the command 148 to cause the flash memory device 104 to move data from an identified die 166 to one or more other dies 166 of the flash memory device 104, results in the stored data becoming more evenly distributed across the dies 166. The stored data being more evenly distributed across the dies 166 results in improved write throughput by increasing the distribution of write data across multiple dies 166 of the flash memory device 104. The disclosed techniques thus help to recover write performance at a multi-die flash memory device even if any of the dies is unevenly fragmented or exhausted, providing the technical advantage of enabling the system 100 to restore and achieve desired key performance indicators (KPIs) such as write throughput. By utilizing the dies 166 in the flash memory 164 more effectively, write KPIs can be improved.

It should be understood that the particular order of operations in the above example(s), or in other examples described herein, is provided for purposes of illustration and not of limitation. In other examples, two or more operations can be performed in another order.

In a UFS implementation of the system 100, the L2P address mapping table 124 at the system memory 114 corresponds to a host performance booster (HPB) and is loaded from the UFS device (the flash memory device 104) during HPB initialization by issuing HPB READ BUFFER command(s). The host device 102 receives PBAs in addition to LBAs, transfer length, logical unit numbers (LUNs), die identifiers, etc., which the host controller 112 can use to check the status and determine whether all possible dies 166 in the flash memory device 104 are effectively utilized or not.

After initialization, if the host controller 112 determines that the trigger condition 132 is satisfied—e.g., all the write operations are being written onto a single die 166 (based on acknowledge (ACK) UFS protocol information unit (UPIU) packets from the flash memory device 104)—then the write monitoring mode is activated. For example, the host controller 112 may detect that all the write operations are being performed to the same die 166 for a time period that is greater than or equal to a threshold time, or for a count of write operations that is greater than a threshold count, either of which may be configurable (e.g., by an original equipment manufacturer (OEM)). The write monitoring mode can correspond to a capability mode for the host controller 112 or device controller 162 that can be included in the JEDEC standard for UFS.

The host device 102 sets up the write monitoring mode and sends recommendations to the flash memory device 104 to further enable effective utilization of available dies. The data already written to the most utilized die is re-spread accordingly by enabling the selective refresh mechanism as initiated by the host device 102. The host device 102 may send recommendations to re-spread contents of the flash memory 164 evenly across available dies 166 to make the majority, or all, of the dies 166 available for upcoming write operations. In order not to interfere with actual real-time traffic, the host device 102 may prepare the write monitoring mode recommendation UPIU packet during a pre-hibernate mode (e.g., when the command queues are empty).

Thus, the host side operations performed by the host device 102 can include: (1) identifying congestion in a single die (e.g., occupancy percentage), (2) enabling the host write monitoring mode (e.g., by setting bit 7 of the command UPIU operational flags), (3) initiating selective refresh over the blocks of the congested die to respread among available dies, and (4) enabling "smart writing" of blocks among dies (e.g., by performing parallel writes to multiple dies rather than sequential writes to a single die), as described further with reference to FIG. 2.

In some aspects, an option to enable the write monitoring mode can be set by either the host device 102 or by the flash memory device 104. A register, referred to herein as "bWriteMonitoring" (e.g., an 8-bit register), can be set to the value 00h (where "h" indicates hexadecimal) to indicate that write monitoring mode is disabled, 01h to indicate flash device mode, or 02h to indicate host mode. A default mode can be set to 01h (device mode) or to the last operating mode when enabled. In some implementations, the host mode can be enabled when the command queue is empty, and the device mode can be enabled when the flash memory device 104 decides to address its own wear-leveling activities.

In the device mode, since the flash memory device 104 can determine if the data from the host device 102 is being written to the same die for a series of requests, the flash memory device 104 tags these LBA ranges to reshuffle between dies and sets device mode in the bWriteMonitoring register. The device mode bit is cleared from the bWriteMonitoring register when the flash memory device 104 has performed the reshuffling operations, and the flash memory device 104 can determine whether to respread data in conjunction with other wear-levelling activities or by setting a "BUSY" state. For example, commands from the host device 102 can be de-prioritized or not honored when the "BUSY" line is set. An example of using the device mode is described in further detail with reference to FIG. 8.

In the host mode, the host controller 112 identifies an appropriate time to initiate the process of re-shuffling data at the flash memory 164 based on the command queue status 146, and can pause or abort the data re-shuffling processing based on the upcoming requests. The host controller 112 can therefore properly prioritize such requests and can perform focused fragmentation (e.g., distribution of data across multiple dies). The host mode can be cleared without delay, and the LBAs can be shuffled without delay, as a result of being an on-demand request from the host device 102.

Although various examples are described herein using an UFS implementation, the disclosed techniques are not limited to UFS implementations and are applicable to a variety of storage technologies, such as NAND, UFS, NVMe, or any other multi-die storage device that uses L2P address mapping tables and that is susceptible to sequential write operations in the same die.

Figure 2:
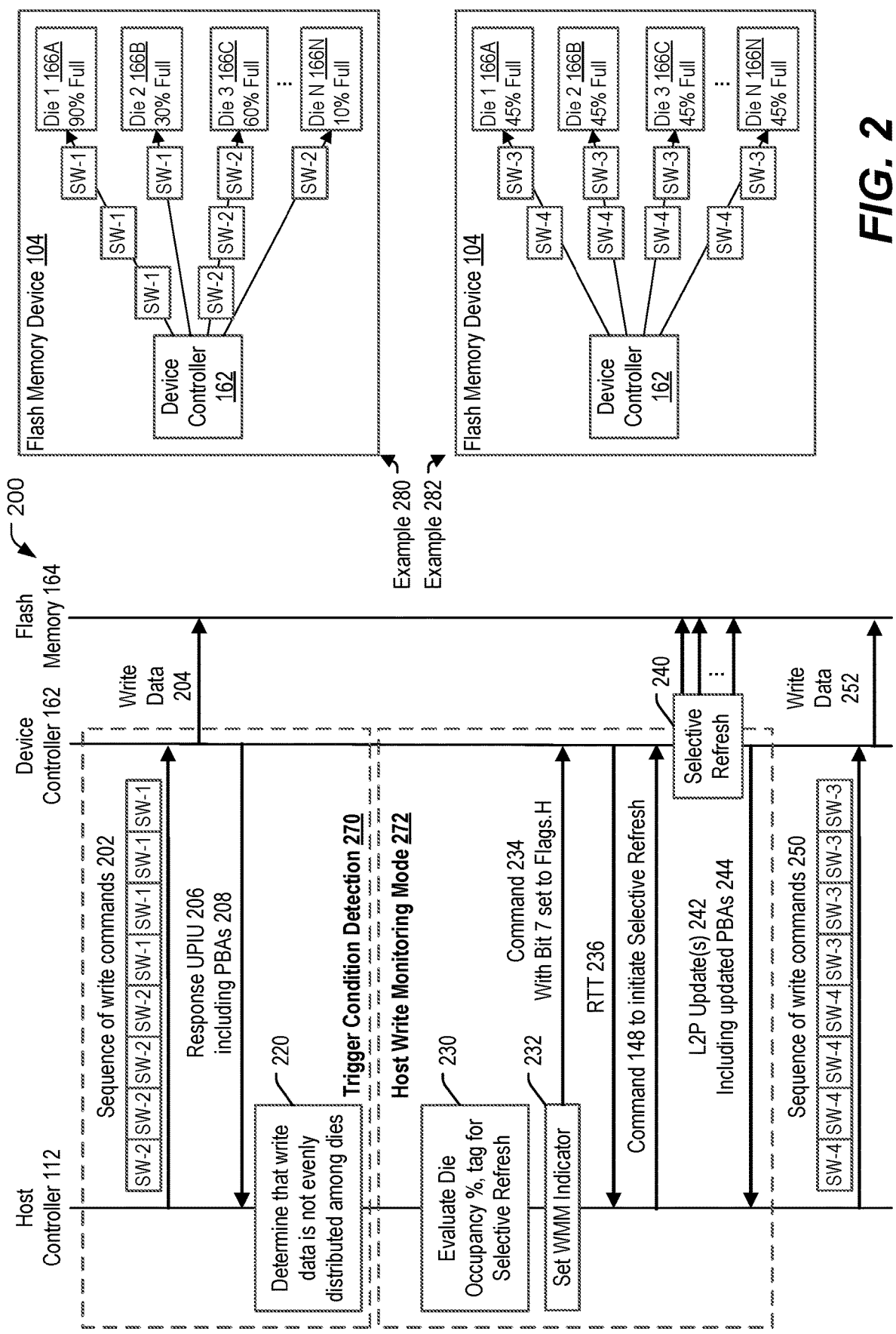
FIG. 2 is a diagram of an illustrative aspect of operations to improve write throughput of a flash memory device, in accordance with some examples of the present disclosure.

FIG. 2 is a diagram illustrating operations 200 to improve write throughput of a flash memory device using a host write monitoring mode (e.g., bWriteMonitoring=02h), in accordance with some examples of the present disclosure. In a particular aspect, one or more of the operations 200 are performed by the write data distribution monitor 130, the host controller 112, the host device 102, the device controller 162, the flash memory 164, the flash memory device 104, the system 100 of FIG. 1, or a combination thereof.

The host controller 112 sends a sequence of write commands 202, illustrated as four "SW-1" units followed by four "SW-2" units, to the device controller 162 of the flash memory device 104, and the device controller 162 sends the write data 204 for storage at the flash memory 164. As illustrated in a first example 280 of the flash memory device 104, the device controller 162 initiates a sequence of data write operations that sends three of the SW-1 units to the first die 166A, one of the SW-1 units to the second die 166B, three of the SW-2 units to the third die 166C, and one of the SW-2 units to the Nth die 166N. The dies 166 of the flash memory device 104 have uneven data occupancy, with the first die 166A being 90% full, the second die 166B being 30% full, the third die 166C being 60% full, and the Nth die 166N being 10% full.

The device controller 162 sends one or more response UPIUs 206 indicating the PBAs 208, including die information, of the write data 204 written to the flash memory 164 for the sequence of write commands 202. The host controller 112 processes the information of the response UPIUs 206 to identify that the trigger condition 132 is satisfied. The trigger condition 132 being satisfied indicates that, after completion of the sequence of data write operations to store the write data 204 to the flash memory device 104, the write data 204 was not evenly distributed among the dies 166 of the flash memory device 104. To illustrate, the host controller 112 may determine that multiple units of the write data 204 are written to the same die 166A rather than evenly distributed, at operation 220.

In response to detecting the trigger condition 132, the host controller 112 exits a trigger condition detection mode 270 and initiates a host write monitoring mode 272. In the host write monitoring mode 272, the host controller 112 can access the L2P address mapping table 124 and evaluate die occupancy percentage (%) of the dies 166 to tag (e.g., designate) a particular die for selective refresh, at an occupancy detection operation 230. For example, the host controller 112 can tag the first die 166A and the third die 166C for selective refresh due to having occupancy above a threshold.

The host controller 112 also sets the indicator 144 of the host write monitoring mode 272 based on determining that the trigger condition 132 is satisfied, at operation 232. The indicator 144 of the host write monitoring mode 272 may correspond to a host flag in a command header sent to the device controller 162 of the flash memory device 104. In the illustrated example, the host controller 112 enables the host write monitoring mode 272 at the flash memory device 104 through a command UPIU 234 that is sent to the flash memory device 104 with bit 7 set to Flags.H (e.g., a header flag for the command that indicates the host write monitoring mode).

The flash memory device 104 responds with a ready to transfer (RTT) UPIU 236, and the host controller 112 sends the command 148 to initiate selective refresh for the data from the identified dies (e.g., the first die 166A and the third die 166C) with an occupancy percentage above the threshold. The command 148 can correspond to a refresh command using a "manual-selective" refresh operation method (e.g., a parameter "bRefreshMethod" of the refresh command can be set to 02h, representing Manual-Selective), and the "manual-selective" refresh operation method can correspond to a selective refresh operation 240 that is supported by the flash memory device 104. For example, the selected LBAs 140 of FIG. 1 may be sent in conjunction with the command 148, identifying one or more ranges of LBAs of data stored at the identified dies that are to be moved to other dies of the flash memory device 104 during the selective refresh operation 240. In a particular implementation, the selective refresh operation 240 corresponds to the selective refresh operation 180 of FIG. 1.

The flash memory device 104 performs the selective refresh operation 240 to move the identified data to other dies 166 of the flash memory 164, such as illustrated in a second example 282 of the flash memory device 104 after fragmentation (e.g., redistribution) of the identified data, in which each of the dies is 45% full. As the identified data is moved among the dies 166, the device controller 162 sends to the host controller 112 one or more L2P updates 242 with the latest L2P table information indicating the movement of the data within the flash memory 164. To illustrate, the host controller 112 receives, from the flash memory device 104, updated physical block addresses 244 associated with the LBAs 142 after movement of the data to one or more destination dies 166 of the flash memory device 104, updates the L2P address mapping table 124 based on the updated physical block addresses 244, and ends the host write monitoring mode 272.

As illustrated in the second example 282 of the flash memory device 104, since the data in the dies 166 is approximately evenly distributed, all of the dies 166 can be used for a "smart write" of subsequent data. For example, the host controller 112 sends another sequence of write commands 250, illustrated as four "SW-3" units followed by four "SW-4" units, to the device controller 162 of the flash memory device 104, and the device controller 162 sends the write data 252 for storage at the flash memory 164. As illustrated in the second example 282, the device controller 162 initiates a sequence of data write operations that sends one SW-3 unit to each of the dies 166, followed by writing one SW-4 unit to each of the dies 166. As a result, the write data 252 is evenly written to the available dies 166, enhancing write throughput.

To illustrate, in the first example 280, the amount of time used by the flash memory device 104 to store the write data 204 to the flash memory 164 is limited by the time required to sequentially write three units of the write data 204 to a single die (e.g., 2400 us to write three "SW-1" units to the first die 166A). In contrast, in the second example 282, the amount of time used by the flash memory device 104 to store the write data 252 to the flash memory 164 corresponds to the time required to sequentially write two units of the write data 252 to a single die (e.g., 1600 us to write two "SW-3" units to the first die 166A). The reduced latency to write the same amount of data to the flash memory 164 represents an improved write throughput of the flash memory device 104.

FIG. 3 is a ladder diagram of an illustrative aspect of operations 300 to improve write throughput of a flash memory device, in accordance with some examples of the present disclosure. In FIG. 3, the host controller 112 evaluates whether the trigger condition 132 is satisfied based on counts of write operations to each respective destination die 166 indicating an uneven distribution of write data among the dies 166. In a particular aspect, one or more of the operations 300 are performed by the write data distribution monitor 130, the host controller 112, the host device 102, the device controller 162, the flash memory 164, the flash memory device 104, the system 100 of FIG. 1, or a combination thereof.

The operations 300 include, in a trigger condition detection mode 370, the host controller 112 sending the sequence of write commands 202 to the device controller 162, and the device controller 162 performing a sequence of data write operations 302 to store the write data 204 of FIG. 2 to the flash memory 164. After completing the data write operations 302, the device controller 162 sends the response UPIU 206 including the PBAs 208 to the host controller 112.

Based on the information in the response UPIU 206, the host controller 112 performs an operation 320 that determines whether the trigger condition 132 is satisfied. The trigger condition 132 being satisfied indicates that, after completion of the sequence of data write operations 302 to write the write data 204 to the flash memory device 104, the write data 204 was not evenly distributed among the dies 166 of the flash memory device 104.

As illustrated, the operation 320 includes generating counts 310 of write operations to each die 166, at operation 322. For example, the counts 310 include a first count (Die 1 Count) 310A that indicates how many write operations were performed to the first die 166A, and one or more additional counts including an Nth count (Die N Count) 310N that indicates how many write operations were performed to the Nth die 166N.

The operation 320 also includes analyzing the counts 310 to determine whether the write data 204 is substantially evenly distributed among the dies 166, at operation 324. For example, the host controller 112 may compare the smallest of the counts 310 (e.g., the smallest amount of the write data 204 that was written to any of the dies 166) to the largest of the counts 310 (e.g., the largest amount of the write data 204 that was written to any of the dies 166). The host controller 112 compares the difference between the largest and the smallest of the counts 310 to a threshold. If the difference between the largest and the smallest of the counts 310 is greater than the threshold, the write data 204 was not substantially evenly distributed among the dies 166, and the trigger condition 132 is satisfied.

Using the write operation of the first example 280 of FIG. 2 to illustrate, the first count 310A for the first die 166A indicates three units of data, the second count 310B for the second die 166B indicates one unit of data, the third count 310C for the third die 166C indicates three units of data, and the Nth count 310N for the Nth die 166N indicates one unit of data. The difference between the largest count 310 (e.g., three, for the count 310A) and the smallest count 310 (e.g., one, for the count 310B) is two units of data, which is larger than a threshold (e.g., one unit of data). Although a threshold indicating one unit of data is used in the present example, other values of the threshold may be used in other examples.

The host controller 112 thus evaluates, at the operation 320, whether the trigger condition 132 is satisfied based on the counts 310 of the write operations 302 to each respective destination die 166 of the flash memory device 104 indicating an uneven distribution of the write data 204 among the dies 166 of the flash memory device 104.

Upon detection that the trigger condition 132 is satisfied, the host controller 112 initiates entry into the host write monitoring mode 272, during which the occupancy detection operation 230 is performed, the command 148 is sent to the device controller 162, and the selective refresh operation 240 is performed to spread the identified data among the dies 166, as described previously with reference to FIG. 2. After completion of the host write monitoring mode 272, the data stored in the device controller 162 is more evenly distributed among the available dies 166, enabling the device controller 162 to perform write operations responsive to the sequence of write commands 250 to more evenly spread the write data 252 among the available dies 166 of the flash memory 164.

Figure 4:
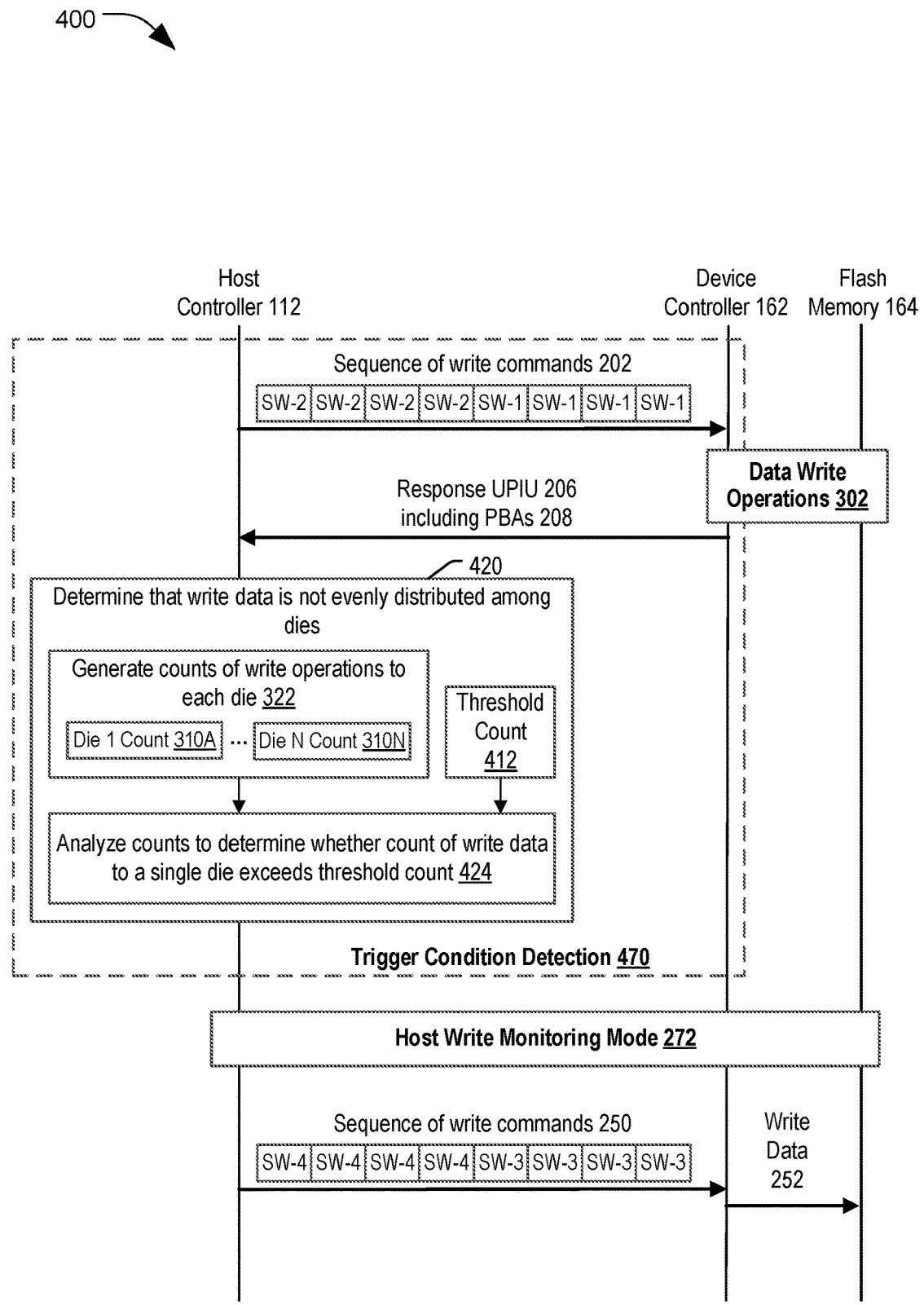
FIG. 4 is a ladder diagram of another illustrative aspect of operations to improve write throughput of a flash memory device, in accordance with some examples of the present disclosure.

FIG. 4 is a ladder diagram of an illustrative aspect of operations 400 to improve write throughput of a flash memory device, in accordance with some examples of the present disclosure. In FIG. 4, the host controller 112 evaluates whether the trigger condition 132 is satisfied based on whether a count of sequential write operations to a single die 166 exceeds a threshold count. In a particular aspect, one or more of the operations 400 are performed by the write data distribution monitor 130, the host controller 112, the host device 102, the device controller 162, the flash memory 164, the flash memory device 104, the system 100 of FIG. 1, or a combination thereof.

The operations 400 include, in a trigger condition detection mode 470, the host controller 112 sending the sequence of write commands 202 to the device controller 162, and the device controller 162 performing the sequence of data write operations 302 to store the write data 204 to the flash memory 164. After completing the data write operations 302, the device controller 162 sends the response UPIU 206 including the PBAs 208 to the host controller 112.

Based on the information in the response UPIU 206, the host controller 112 performs an operation 420 that includes determining whether the trigger condition 132 is satisfied based on whether the write data 204 was evenly distributed among the dies 166 of the flash memory device 104. As illustrated, the operation 420 includes generating the counts 310 of write operations to each die 166, at the operation 322. The operation 420 also includes analyzing the counts 310 to determine whether the count of write data 204 written to a single die 166 exceeds a threshold count 412, at operation 424. For example, the host controller 112 may compare each of the counts 310 to the threshold count 412. If any of the counts 310 exceeds the threshold count 412, the write data 204 was not substantially evenly distributed among the dies 166, and the trigger condition 132 is satisfied.

In a particular implementation, the threshold count 412 is determined based on the size of the write data 204 and the number of available dies. Using the write operation of the first example 280 of FIG. 2 to illustrate, the count 310A for the first die 166A indicates three units of data, the count 310B for the second die 166B indicates one unit of data, the count 310C for the third die 166C indicates three units of data, and the count 310N for the Nth die 166N indicates one unit of data. The size of the threshold count 412 can be determined based on the amount of data written to the flash memory 164 (e.g., 8 units of data) and the number of dies 166 of the flash memory 164 (e.g., N=4). For example, the threshold count 412 can be determined using the expression: ceil[(amount of data written)/(number of dies)], where ceil [Z] represents a ceiling function that returns the smallest integer that is greater than or equal to Z. In the first example 280 of FIG. 2, the threshold count 412 can correspond to ceil[(8 units of data)/(4 dies)]=2 units of data per die. Although a threshold count 412 indicating two units of data is used in the present example, other values of the threshold count 412 may be used in other examples.

The host controller 112 is thus configured to evaluate, at the operation 420, whether the trigger condition 132 is satisfied based on whether a count of sequential write operations to a single die 166 exceeds the threshold count 412, indicating an uneven distribution of the write data 204 among the dies 166 of the flash memory device 104.

Upon detection that the trigger condition 132 is satisfied, the host controller 112 initiates entry into the host write monitoring mode 272, during which the occupancy detection operation 230 is performed, the command 148 is sent to the device controller 162, and the selective refresh operation 240 is performed to spread the identified data among the dies 166, as described previously with reference to FIG. 2. After completion of the host write monitoring mode 272, the data stored in the device controller 162 is more evenly distributed among the available dies 166, enabling the device controller 162 to perform write operations responsive to the sequence of write commands 250 to more evenly spread the write data 252 among the available dies 166 of the flash memory 164.

Figure 5:
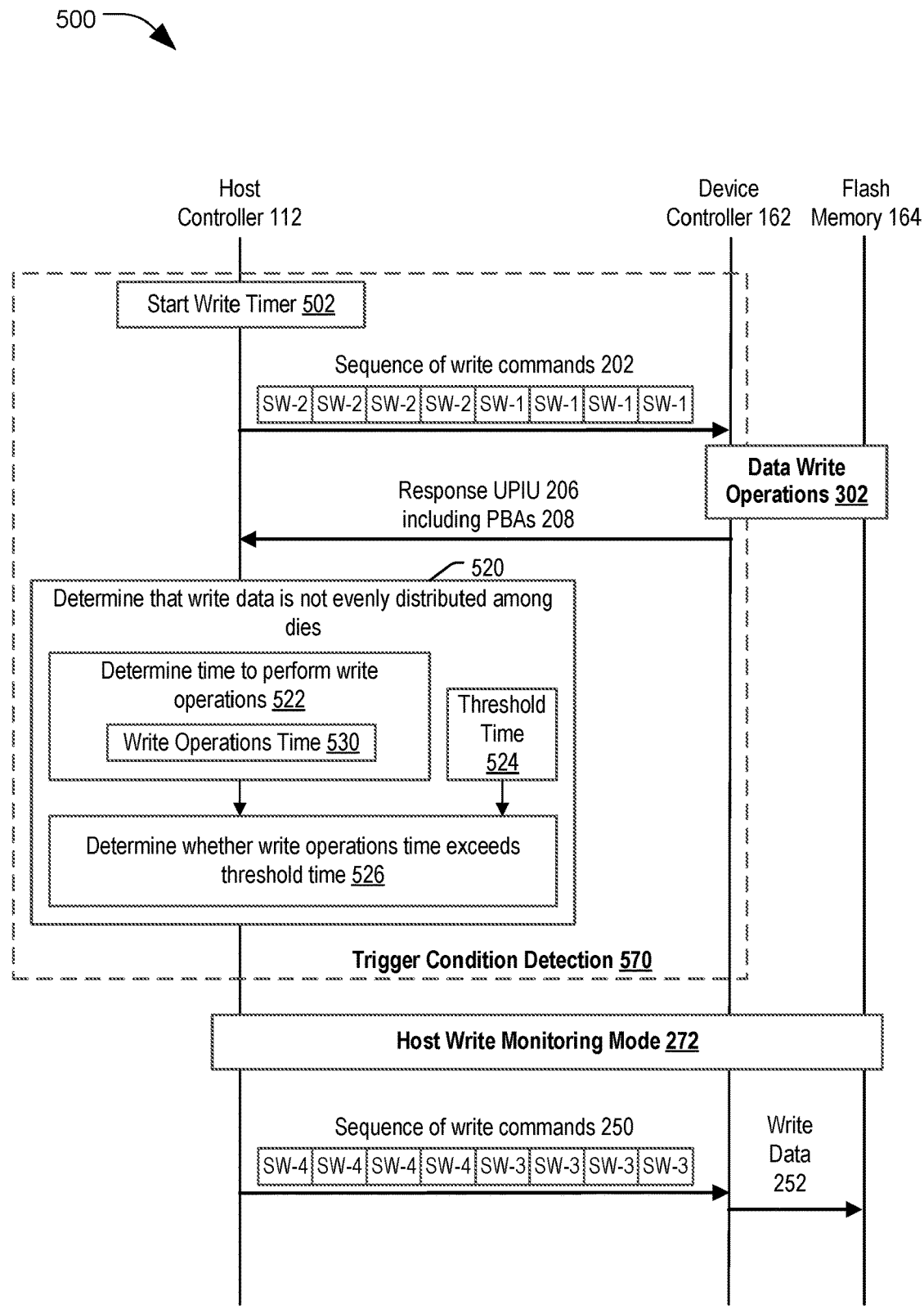
FIG. 5 is a ladder diagram of another illustrative aspect of operations to improve write throughput of a flash memory device, in accordance with some examples of the present disclosure.

FIG. 5 is a ladder diagram of an illustrative aspect of operations 500 to improve write throughput of a flash memory device, in accordance with some examples of the present disclosure. In FIG. 5, the host controller 112 evaluates whether the trigger condition 132 is satisfied based on whether a time that it takes to perform sequential write operations exceeds a threshold time. In a particular aspect, one or more of the operations 500 are performed by the write data distribution monitor 130, the host controller 112, the host device 102, the device controller 162, the flash memory 164, the flash memory device 104, the system 100 of FIG. 1, or a combination thereof.

The operations 500 include, in a trigger condition detection mode 570, the host controller 112 starting a write timer 502 in conjunction with sending the sequence of write commands 202 to the device controller 162, and the device controller 162 performing the sequence of data write operations 302 to store the write data 204 to the flash memory 164. After completing the data write operations 302, the device controller 162 sends the response UPIU 206 including the PBAs 208 to the host controller 112.

Based on the information in the response UPIU 206, the host controller 112 performs an operation 520 that includes determining whether the trigger condition 132 is satisfied. As illustrated, the operation 520 includes determining an amount of time, illustrated as a write operations time 530, that the flash memory device 104 took to perform the data write operations 302, at operation 522. For example, the write operations time 530 can correspond to a value of the write timer 502 upon the host controller 112 receiving the response UPIU 206 indicating the data write operations 302 are completed. In another example, the write timer 502 may be omitted, and the write operations time 530 may instead be determined based on a difference between a first timestamp indicating when the sequence of write commands 202 were sent to the device controller 162 and a second timestamp indicating receipt of the response UPIU 206.

The operation 520 also includes comparing the write operations time 530 to a threshold time 524, at operation 526. If the write operations time 530 exceeds the threshold time 524, the write data 204 was not substantially evenly distributed among the dies 166, and the trigger condition 132 is satisfied.

In a particular implementation, the threshold time 524 is determined based on the size of the write data 204 and the number of available dies. Using the write operation of the first example 280 of FIG. 2 to illustrate, the threshold time 524 can be determined based on the amount of data written to the flash memory 164 (e.g., 8 units of data) and the number of dies 166 of the flash memory 164 (e.g., N=4). For example, the threshold time 524 can be determined using the expression: (write latency for a single unit of data)*ceil [(amount of data written)/(number of dies)]. In the first example 280 of FIG. 2, the threshold time 524 can correspond to (800 us per unit of data)*ceil[(8 units of data)/(4 dies)]=1600 us. Although a threshold time 524 is determined based on multiples of an 800 us write latency, in other examples, other values may instead be used. For example, the threshold time 524 can be at least partially based on historical write latency that may be determined by the host controller 112 to accommodate changes to write latency over the life of the flash memory device 104, such as due to device wear, temperature effects, storage density (e.g., single-level cell (SLC), multi-level cell (MLC), triple-level cell (TLC), quadruple-level cell (QLC), etc.), or other conditions that can affect write latency for one or more of the dies 166.

The threshold time 524 indicates a largest amount of time the flash memory device 104 is expected to take to store the write data 204 evenly across the dies 166. For example, the second example 282 of FIG. 2 illustrates that, when the write data 252 is evenly distributed among the dies 166, two write operations are performed at each die 166. Since the dies 166 are written in parallel, the total time to write eight units of data evenly to the four dies 166A-166N corresponds to the write latency to write two units of data to a single die (e.g., 2*800 us=1600 us). If instead the write data is unevenly distributed, such as in the first example 280 of FIG. 2, one or more of the dies 166 will receive more than two units of data (e.g., the first die 166A and the third die 166C each receive three units of the write data 204), so the total time to complete the data write operations 302 is 3*800 us=2400 us, which exceeds the 1600 us threshold time 524 of the above example.

The host controller 112 is thus configured to evaluate, at the operation 520, whether the trigger condition 132 is satisfied based on whether the write operations time 530 that it takes to perform the sequential write operations 302 exceeds the threshold time 524, indicating an uneven distribution of the write data 204 among the dies 166 of the flash memory device 104.

Upon detection that the trigger condition 132 is satisfied, the host controller 112 initiates entry into the host write monitoring mode 272, during which the occupancy detection operation 230 is performed, the command 148 is sent to the device controller 162, and the selective refresh operation 240 is performed to spread the identified data among the dies 166, as described previously with reference to FIG. 2. After completion of the host write monitoring mode 272, the data stored in the device controller 162 is more evenly distributed among the available dies 166, enabling the device controller 162 to perform write operations responsive to the sequence of write commands 250 to more evenly spread the write data 252 among the available dies 166 of the flash memory 164.

Figure 6:
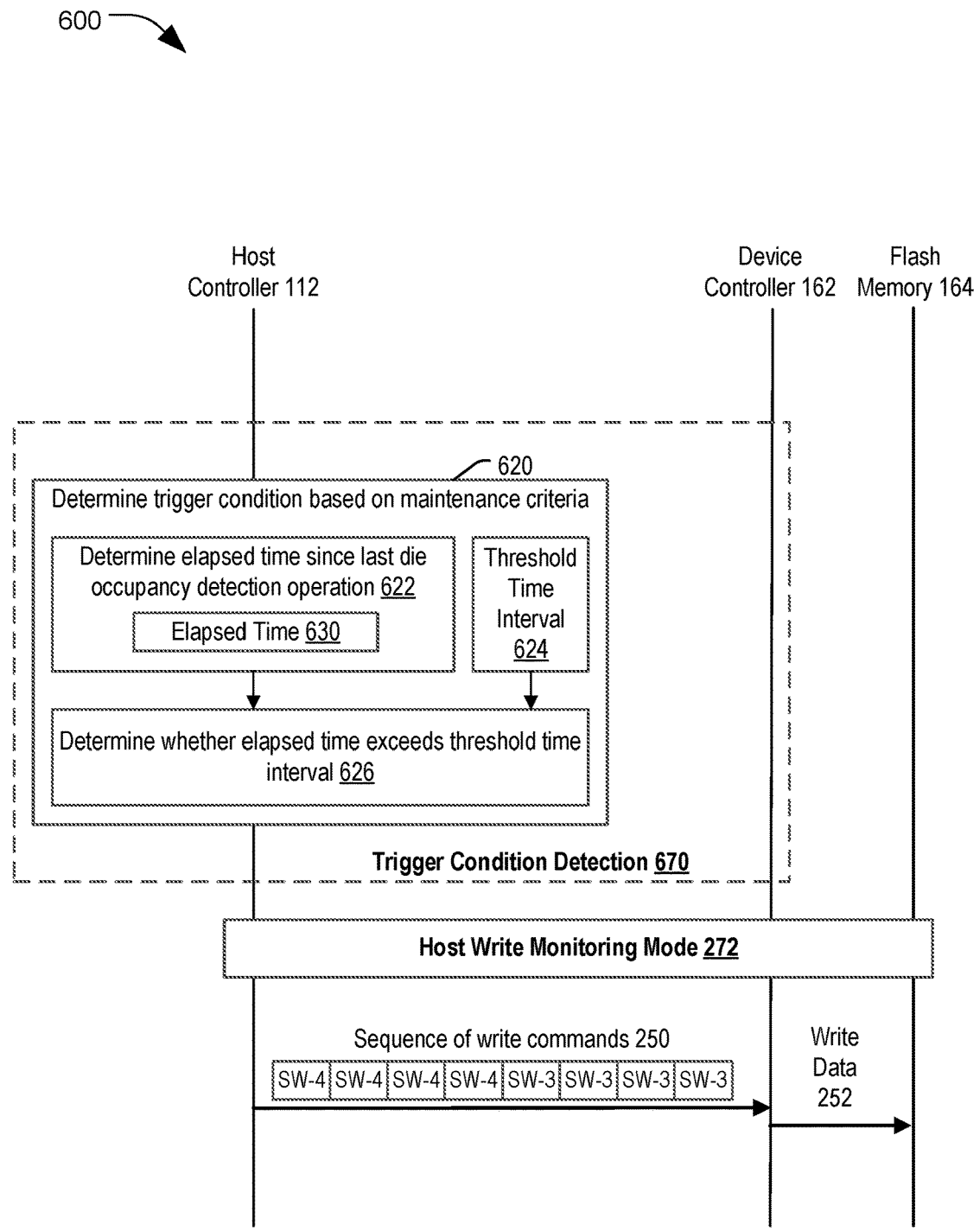
FIG. 6 is a ladder diagram of another illustrative aspect of operations to improve write throughput of a flash memory device, in accordance with some examples of the present disclosure.

FIG. 6 is a ladder diagram of an illustrative aspect of operations 600 to improve write throughput of a flash memory device, in accordance with some examples of the present disclosure. In FIG. 6, the host controller 112 evaluates whether the trigger condition 132 is satisfied based on whether an elapsed time since a die occupancy detection operation 230 was performed exceeds a threshold time interval. In a particular aspect, one or more of the operations 600 are performed by the write data distribution monitor 130, the host controller 112, the host device 102, the device controller 162, the flash memory 164, the flash memory device 104, the system 100 of FIG. 1, or a combination thereof.

The operations 600 include, in a trigger condition detection mode 670, the host controller 112 performing an operation 620 that determines whether the trigger condition 132 is satisfied. In contrast to the examples of FIGS. 2-5, the operation 620 is not based on analyzing results of a sequence of write commands 202. Instead, the operation 620 includes determining an amount of time, illustrated as an elapsed time 630, since the host controller 112 last performed the occupancy detection operation 230, at operation 622.

The operation 620 also includes comparing the elapsed time 630 to a threshold time interval 624, at operation 626. For example, the threshold time interval 624 can correspond to an amount of time (e.g., one day, one week, one month, etc.) used by the host controller 112 to schedule periodic or occasional examination of the data distribution among the dies 166 of the flash memory device 104. If the elapsed time 630 exceeds the threshold time interval 624, the trigger condition 132 is satisfied.

The host controller 112 is thus configured to evaluate, at the operation 620, whether the trigger condition 132 is satisfied based on whether the elapsed time 630 since a die occupancy detection operation 230 was performed exceeds a threshold time interval 624, indicating that a flash management or housekeeping-type maintenance operation is to be performed to check whether data is substantially evenly distributed among the dies 166 of the flash memory device 104 and, if not, to re-distribute the data among the dies 166.

Upon detection that the trigger condition 132 is satisfied, the host controller 112 initiates entry into the host write monitoring mode 272, during which the occupancy detection operation 230 is performed. If the occupancy detection operation 230 indicates uneven data occupancy among the dies 166, the command 148 is sent to the device controller 162, and the selective refresh operation 240 is performed to spread the data among the dies 166, as described previously with reference to FIG. 2. After completion of the host write monitoring mode 272, the data stored in the device controller 162 is substantially evenly distributed among the available dies 166, enabling the device controller 162 to perform write operations responsive to the sequence of write commands 250 to in which the write data 252 is evenly spread among the available dies 166 of the flash memory 164.

Although the host controller 112 performs the operation 620 to determine whether the trigger condition 132 is satisfied based on an elapsed time 630 since the occupancy detection operation 230 was performed, in other implementations the operation 620 could alternatively, or additionally, detect that the trigger condition 132 is satisfied based on a count of write operations that have been performed at the flash memory device 104 since the last occupancy detection operation 230 was performed. For example, upon completing an instance of the occupancy detection operation 230, the host controller 112 can reset a counter that tracks data write commands sent to the flash memory device 104. In response to the counter reaching or exceeding a threshold count of write operations, the host controller 112 can determine that the trigger condition 132 is satisfied and initiate the occupancy detection operation 230.

Figure 7:
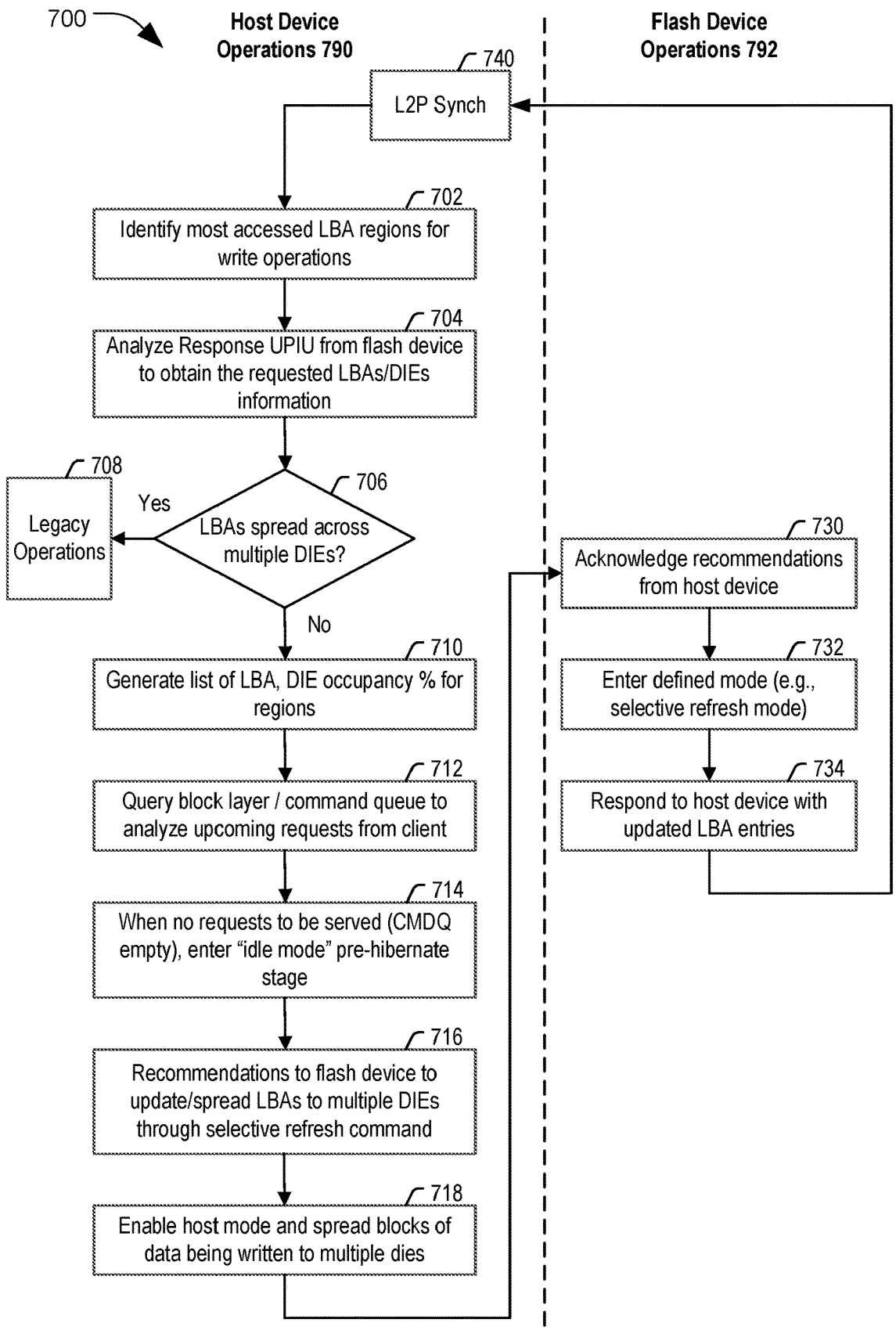
FIG. 7 is a diagram of a particular implementation of operations to improve write throughput of a flash memory device, in accordance with some examples of the present disclosure.

FIG. 7 is a diagram of a particular implementation of operations 700 to improve write throughput of a flash memory device, in accordance with some examples of the present disclosure. The operations 700 include host device operations 790 that may be performed by the host device 102 (e.g., at the host controller 112) and flash device operations 792 that may be performed by the flash memory device 104 (e.g., at the device controller 162).

The host device operations 790 include identifying the most accessed LBA regions for write operations, at 702. The host controller 112 may track the LBAs of the write data 204 associated with the sequence of write commands 202 of FIG. 2 and identify which LBA ranges corresponded to the largest number of data writes.

The host device operations 790 include analyzing a response UPIU from the flash device to obtain the requested LBA/DIE information, at 704. To illustrate, the host controller 112 receives the response UPIU 206 that includes the PBAs 208, including DIE information (e.g., an indication of a destination die 166) corresponding to the LBAs of the write data 204.

The host device operations 790 include determining whether the LBAs are spread across multiple DIEs, at 706. For example, the write data distribution monitor 130 may determine whether the write data is evenly distributed among the dies 166, such as based on the operation 220 of FIG. 2, the operation 320 of FIG. 3, or the operation 420 of FIG. 4, as illustrative, non-limiting examples. In response to determining that the LBAs are substantially evenly spread across the DIEs (e.g., the trigger condition 132 is not satisfied), legacy operations 708 are performed (e.g., operations continue as in conventional systems, and the host device 102 does not enter the host write monitoring mode 272).

Otherwise, when the LBAs are not substantially evenly spread across the DIEs (e.g., the trigger condition 132 is satisfied), the host device operations 790 include generating a list of LBA and DIE occupancy percentages for the identified LBA regions, at 710. To illustrate, the host controller 112 may access the L2P address mapping table 124 to determine what proportion of each identified LBA range is on each of the dies 166, which may be performed in conjunction with the occupancy detection operation 230.

The host device operations 790 include querying the block layer/command queue (CMDQ) to analyze upcoming requests from a client of the host controller 112, at 712. For example, the host controller 112 determines the command queue status 146.

The host device operations 790 include, when there are no pending requests to be served (e.g., the operative command queue is empty), entering an "idle mode" pre-hibernate state, at 714, and sending recommendations to the flash device to update/spread LBAs to multiple DIEs through a selective refresh command, at 716. For example, the host controller 112 may send the selected LBAs 140 to the flash memory device 104 for processing in conjunction with the command 148.

The host device operations 790 also include enabling a host mode and spreading blocks of data being written to multiple DIEs, at 718. For example, the host controller 112 may set the host write monitoring mode indicator 144 to initiate spreading of the data associated with the selected LBAs 140.

Processing continues with the flash device operations 792, including acknowledging the recommendations from the host device, at 730. For example, the flash memory device 104 may send one or more ACK UPIUs to the host device 102 acknowledging receipt of the recommendations associated with the command 148.

The flash device operations 792 include entering the defined mode (e.g., the selective refresh mode), at 732, and, after spreading data across the DIEs (e.g., the selective refresh operation 240), responding to the host device with updated LBA entries, such as the L2P update(s) 242 including the updated PBAs 244, at 734.

The host device operations 790 include performing a L2P sync, at 740, based on the updated LBA entries. For example, the host controller 112 may update one or more entries of the L2P address mapping table 124 based on the L2P update(s) 242 including the updated PBAs 244 so that the L2P address mapping table 124 matches the L2P address mapping table 174 at the flash memory device 104.

Thus, the operations 700 include actions performed by both the host device 102 and the flash memory device 104. The host controller 112 performs actions such as: (1) sending HPB write command(s) to the flash memory device 104, (2) receiving a HPB response UPIU, which includes die information along with other legacy information, from the flash memory device 104, (3) identifying the most accessed LBA regions which correspond to logical unit number (LUN) corresponding to a DIE, such as by updating a counter each time the identified LBA regions are accessed, comparing the counter to a threshold, and initiating a timer for the first-time accessed vs. each time the counter updates, (4) checking block layer/Command Queue for the commands to be served, and switching to Idle state when the Command Queue is empty or no other commands are piled up in block layer, and once the host controller 112 is in Idle mode, enabling Host write monitoring mode, and (5) preparing a Host mode UPIU packet as a recommendation to the flash memory device 104 to re-shuffle the LBAs between multiple dies.

In addition, the flash memory device 104 performs actions such as operations to re-shuffle the data in the requested LBA range from the host controller 112 to multiple dies, and responding with "HWM response UPIU" (e.g., in reference to device control mode (DCM) HPB update UPIU packet from UFS specification). The HWM response UPIU can be enabled as an attribute in UPIU flags. The HWM UPIU can include legacy fields as-is, including Active/Inactive HPB regions, and also subregions such as PBA/LBA/DIE information.

Figure 8:
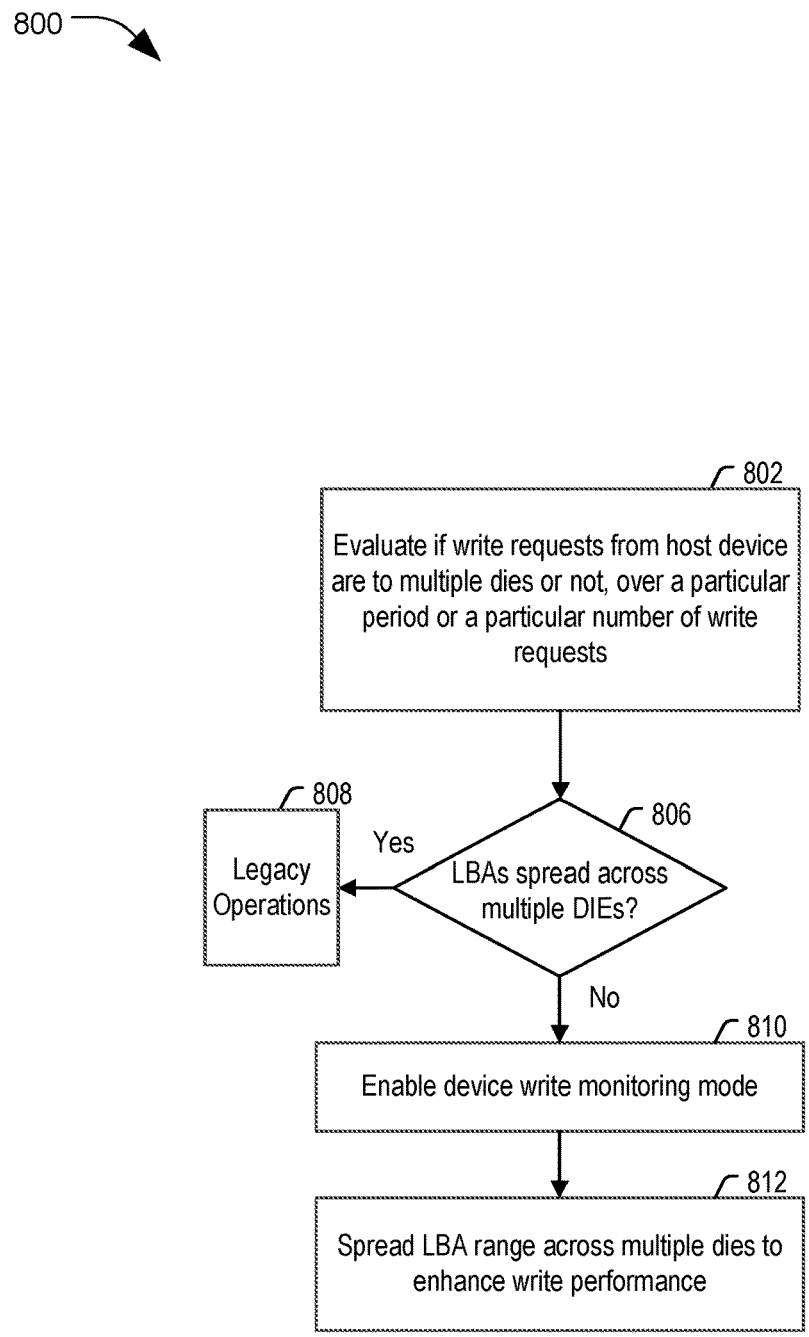
FIG. 8 is a diagram of a particular implementation of operations to improve write throughput of a flash memory device, in accordance with some examples of the present disclosure.

FIG. 8 is a diagram of a particular implementation of operations 800 to improve write throughput of a flash memory device, in accordance with some examples of the present disclosure. The operations 800 can be associated with a device write monitoring mode (e.g., bWriteMonitoring=01h). In a particular implementation, the operations 800 may be performed by the flash memory device 104, such as the device controller 162.

The operations 800 include evaluating if write requests from the host device are to multiple dies or not, over a particular period or a particular number of write requests, at 802. For example, the flash memory device 104 can determine if the write data from the host device 102 is being written to the same die 166 for a series of requests.

The operations 800 include, based on the LBAs of the write data being spread among multiple dies, at 806, performing legacy operations 808. Otherwise, when the device controller 162 detects that the LBAs of the write data are not spread (or are not substantially evenly spread) among multiple dies, the device controller 162 enables the device write monitoring mode, at 810, and spreads LBA range across multiple dies to enhance write performance, at 812. To illustrate, when the device controller 162 detects that LBA ranges associated with the write data are not evenly spread across multiples dies 166, the device controller 162 may tag the LBA ranges to reshuffle between the dies 166 and set the device write monitoring mode in the bWriteMonitoring register.

The flash memory device 104 can determine whether to reshuffle the data in conjunction with performing other wear-leveling activities or by setting a "BUSY" state. When the flash memory device 104 has completed the reshuffling operations, the host controller 112 clears the device write monitoring mode bit from the bWriteMonitoring register.

Figure 9:
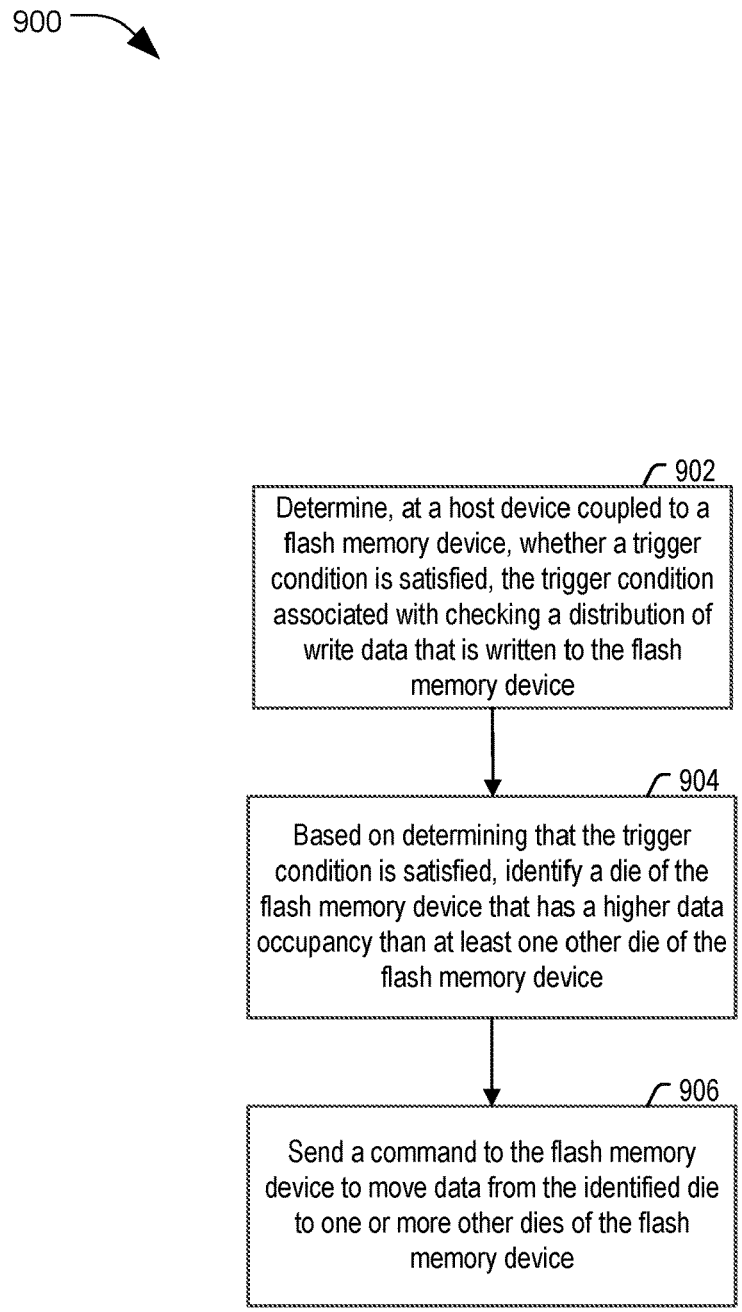
FIG. 9 is a diagram of a particular implementation of a method to improve write throughput of a flash memory device that may be performed by the host device of FIG. 1, in accordance with some examples of the present disclosure.

FIG. 9 is a diagram of a particular implementation of a method 900 to improve write throughput of a flash memory device that may be performed by the host device 102 of FIG. 1, in accordance with some examples of the present disclosure. In a particular aspect, one or more of the operations of the method 900 are performed by the write data distribution monitor 130, the host controller 112, the host device 102, the system 100 of FIG. 1, or a combination thereof.

The method 900 includes, at block 902, determining, at a host device coupled to a flash memory device, whether a trigger condition is satisfied, the trigger condition associated with checking a distribution of write data that is written to the flash memory device. For example, the host controller 112 can determine that the trigger condition 132 is satisfied based on a determination that write data is not evenly distributed among the dies 166 of the flash memory device 104.

According to some aspects, the trigger condition being satisfied indicates that, after completion of a sequence of data write operations to write the write data to the flash memory device, the write data was not evenly distributed among the dies of the flash memory device. In a first example, determining whether the trigger condition is satisfied includes determining whether counts of the write operations to each respective destination die of the flash memory device indicate an uneven distribution of the write data among the dies of the flash memory device, such as described with reference to the operation 320 of FIG. 3. In a second example, determining whether the trigger condition is satisfied includes determining whether a count of sequential write operations to a single die exceeds a threshold count, such as described with reference to the operation 420 of FIG. 4. In a third example, determining whether the trigger condition is satisfied includes determining whether a time that it takes to perform sequential write operations exceeds a threshold time, such as described with reference to the operation 520 of FIG. 5. In a fourth example, determining whether the trigger condition is satisfied includes determining whether an elapsed time since a die occupancy detection operation was performed exceeds a threshold time interval, such as described with reference to the operation 620 of FIG. 6.

The method 900 includes, at block 904, based on determining that the trigger condition is satisfied, identifying, at the host device, a die of the flash memory device that has a higher data occupancy than at least one other die of the flash memory device, at block 904. For example, the host controller 112 can generate the occupancy data 136 including the data occupancy values 138 for each of the dies 166, such as via the occupancy detection operation 230 of FIG. 2.

The method 900 includes, at block 906, sending, at the host device, a command to the flash memory device to move data from the identified die to one or more other dies of the flash memory device. In a particular example, the command corresponds to a selective refresh operation supported by the flash memory device, such as the command 148 corresponding to the selective refresh operation 180 of FIG. 1 and/or the selective refresh operation 240 of FIG. 2. In a particular implementation, the command is sent responsive to detection of an idle condition associated with the flash memory device, such as based on the host controller 112 determining the command queue status 146 of FIG. 1.

According to some aspects, the method 900 includes setting an indicator of a host write monitoring mode based on determining that the trigger condition is satisfied, and the die is identified and the command is sent during the host write monitoring mode. For example, the host controller 112 sets the indicator 144 of the host write monitoring mode. In an illustrative example, the indicator of the host write monitoring mode corresponds to a host flag in a command header sent to the flash memory device, such as the command 234 of FIG. 2.

Movement of the data from the identified die to the one or more other dies improves write throughput via increased distribution of sequential write data across multiple dies of the flash memory device; as a result, the method 900 provides the technical advantage of improving the write throughput of a multi-die flash memory device.

The method 900 of FIG. 9 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 900 of FIG. 9 may be performed by a processor that executes instructions, such as described with reference to FIG. 10.

Figure 10:
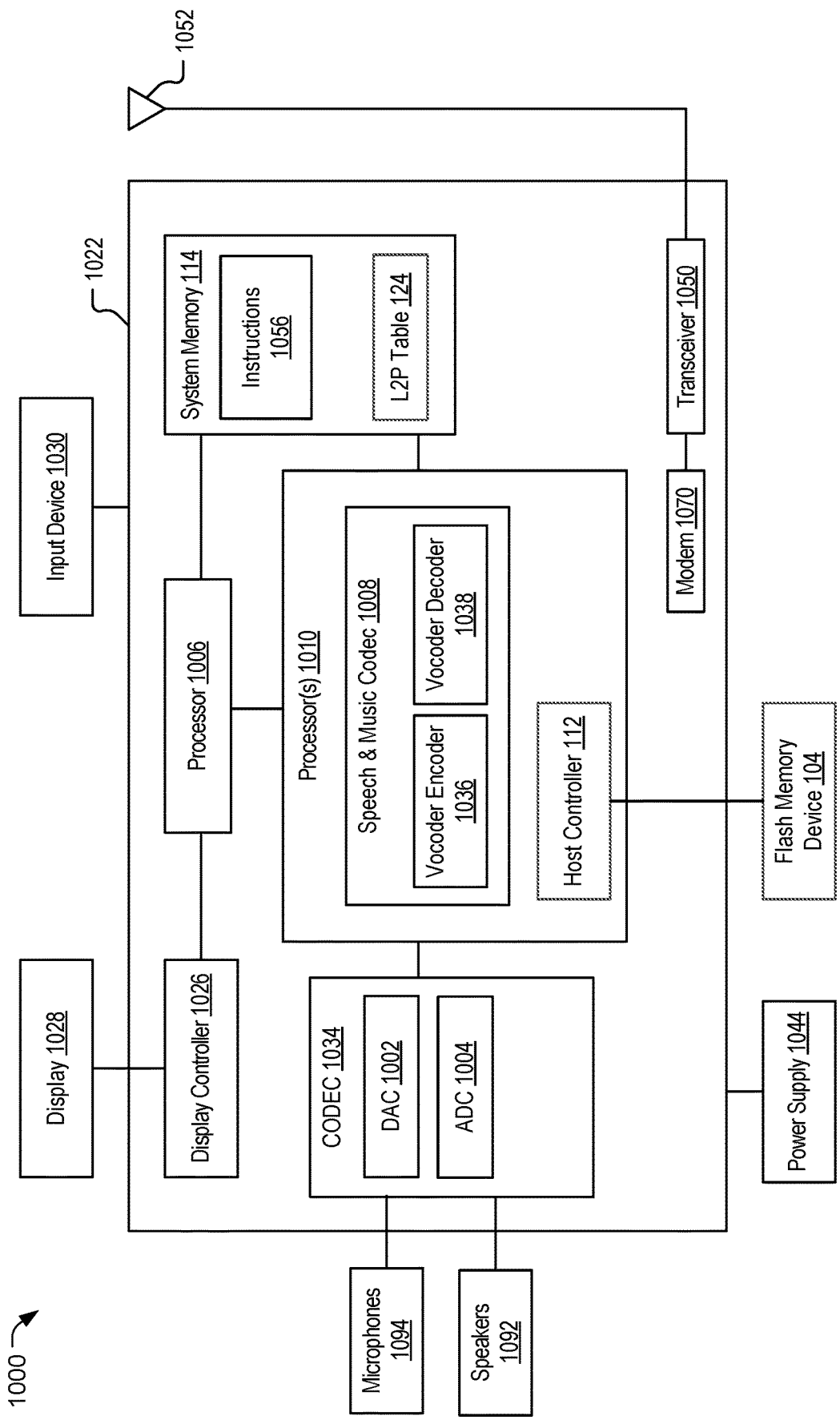
FIG. 10 is a block diagram of a particular illustrative example of a device that is operable to improve write throughput of a flash memory device, in accordance with some examples of the present disclosure.

Referring to FIG. 10, a block diagram of a particular illustrative implementation of a device is depicted and generally designated 1000. In various implementations, the device 1000 may have more or fewer components than illustrated in FIG. 10. In an illustrative implementation, the device 1000 may correspond to the host device 102. In an illustrative implementation, the device 1000 may perform one or more operations described with reference to FIGS. 1-9.

In a particular implementation, the device 1000 includes a processor 1006 (e.g., a CPU). The device 1000 may include one or more additional processors 1010 (e.g., one or more DSPs). The processors 1010 may include a speech and music coder-decoder (CODEC) 1008 that includes a voice coder ("vocoder") encoder 1036, a vocoder decoder 1038, or both. The processors 1010 may include the host controller 112 that is configured to be coupled to the flash memory device 104.

The device 1000 may include the system memory 114 and a CODEC 1034. The system memory 114 may include instructions 1056, that are executable by the one or more additional processors 1010 (or the processor 1006) to implement the functionality described with reference to the host controller 112. The system memory 114 may include the L2P address mapping table 124. The device 1000 may include a modem 1070 coupled, via a transceiver 1050, to an antenna 1052.

The device 1000 may include a display 1028 coupled to a display controller 1026. One or more speakers 1092 and one or more microphones 1094 may be coupled to the CODEC 1034. The CODEC 1034 may include a digital-to-analog converter (DAC) 1002, an analog-to-digital converter (ADC) 1004, or both. In a particular implementation, the CODEC 1034 may receive analog signals from the microphone(s) 1094, convert the analog signals to digital signals using the analog-to-digital converter 1004, and provide the digital signals to the speech and music codec 1008. The speech and music codec 1008 may process the digital signals. In a particular implementation, the speech and music codec 1008 may provide digital signals to the CODEC 1034. The CODEC 1034 may convert the digital signals to analog signals using the digital-to-analog converter 1002 and may provide the analog signals to the speaker(s) 1092.

In a particular implementation, the device 1000 may be included in a system-in-package or system-on-chip device 1022. In a particular implementation, the system memory 114, the processor 1006, the processors 1010, the display controller 1026, the CODEC 1034, and the modem 1070 are included in the system-in-package or system-on-chip device 1022. In a particular implementation, an input device 1030, a power supply 1044, and the flash memory device 104 are coupled to the system-in-package or the system-on-chip device 1022. Moreover, in a particular implementation, as illustrated in FIG. 10, the display 1028, the input device 1030, the speaker(s) 1092, the microphone(s) 1094, the antenna 1052, the flash memory device 104, and the power supply 1044 are external to the system-in-package or the system-on-chip device 1022. In a particular implementation, each of the display 1028, the input device 1030, the speaker (s) 1092, the microphone(s) 1094, the antenna 1052, the flash memory device 104, and the power supply 1044 may be coupled to a component of the system-in-package or the system-on-chip device 1022, such as an interface or a controller. For example, the flash memory device 104 may be coupled to the host controller 112.

The device 1000 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for determining whether a trigger condition is satisfied, the trigger condition associated with checking a distribution of write data that is written to a flash memory device. For example, the means for determining whether a trigger condition is satisfied can correspond to the write data distribution monitor 130, the host controller 112, the processor(s) 110, the host device 102, the system 100 of FIG. 1, the processor 1006, the processor(s) 1010, one or more other circuits or components configured to determine whether a trigger condition is satisfied, the trigger condition associated with checking a distribution of write data that is written to a flash memory device, or any combination thereof.

The apparatus also includes means for identifying, based on determining that the trigger condition is satisfied, a die of the flash memory device that has a higher data occupancy than at least one other die of the flash memory device. For example, the means for identifying, based on determining that the trigger condition is satisfied, a die of the flash memory device that has a higher data occupancy than at least one other die of the flash memory device can correspond to the host controller 112, the processor(s) 110, the host device 102, the system 100 of FIG. 1, the processor 1006, the processor(s) 1010, one or more other circuits or components configured identify, based on determining that the trigger condition is satisfied, a die of the flash memory device that has a higher data occupancy than at least one other die of the flash memory device, or any combination thereof.

The apparatus also includes means for sending a command to the flash memory device to move data from the identified die to one or more other dies of the flash memory device. For example, the means for sending a command to the flash memory device to move data from the identified die to one or more other dies of the flash memory device can correspond to the host controller 112, the processor(s) 110, the host device 102, the system 100 of FIG. 1, the processor 1006, the processor(s) 1010, one or more other circuits or components configured to send a command to the flash memory device to move data from the identified die to one or more other dies of the flash memory device e, or any combination thereof.

In some implementations, a non-transitory computer-readable medium (e.g., a computer-readable storage device, such as the system memory 114) includes instructions (e.g., the instructions 1056) that, when executed by one or more processors (e.g., the processor(s) 110, the one or more processors 1010, or the processor 1006) of a host device (e.g., the host device 102) coupled to a flash memory device (e.g., the flash memory device 104), cause the one or more processors to determine whether a trigger condition (e.g., the trigger condition 132) is satisfied, the trigger condition associated with checking a distribution of write data (e.g., the write data 204) that is written to the flash memory device. The instructions further cause the one or more processors to, based on a determination that the trigger condition is satisfied, identify a die (e.g., the first die 166A) of the flash memory device that has a higher data occupancy than at least one other die (e.g., the second die 166B) of the flash memory device, and send a command (e.g., the command 148) to the flash memory device to move data from the identified die to one or more other dies (e.g., one or more of the dies 166B-166N) of the flash memory device.

Particular aspects of the disclosure are described below in sets of interrelated Examples:

According to Example 1, a host device includes a memory configured to store a logical-to-physical address mapping (L2P) table of a flash memory device; and one or more processors coupled to the memory and configured to be coupled to the flash memory device, wherein the one or more processors are configured to determine whether a trigger condition is satisfied, the trigger condition associated with checking a distribution of write data that is written to the flash memory device; and based on a determination that the trigger condition is satisfied: identify a die of the flash memory device that has a higher data occupancy than at least one other die of the flash memory device; and send a command to the flash memory device to move data from the identified die to one or more other dies of the flash memory device.

Example 2 includes the host device of Example 1, wherein movement of the data from the identified die to the one or more other dies improves write throughput via increased distribution of sequential write data across multiple dies of the flash memory device.

Example 3 includes the host device of Example 1 or Example 2, wherein the trigger condition being satisfied indicates that, after completion of a sequence of data write operations to write the write data to the flash memory device, the write data was not evenly distributed among the dies of the flash memory device.

Example 4 includes the host device of any of Examples 1 to 3, wherein the one or more processors are configured to evaluate whether the trigger condition is satisfied based on counts of the write operations to each respective destination die of the flash memory device indicating an uneven distribution of the write data among the dies of the flash memory device.

Example 5 includes the host device of any of Examples 1 to 4, wherein the one or more processors are configured to evaluate whether the trigger condition is satisfied based on whether a time to perform sequential write operations exceeds a threshold time.

Example 6 includes the host device of any of Examples 1 to 5, wherein the one or more processors are configured to evaluate whether the trigger condition is satisfied based on whether a count of sequential write operations to a single die exceeds a threshold count.

Example 7 includes the host device of any of Examples 1 to 6, wherein the one or more processors are configured to evaluate whether the trigger condition is satisfied based on whether an elapsed time since a die occupancy detection operation was performed exceeds a threshold time interval.

Example 8 includes the host device of any of Examples 1 to 7, wherein the command corresponds to a selective refresh operation supported by the flash memory device.

Example 9 includes the host device of any of Examples 1 to 8, wherein the one or more processors are configured to set an indicator of a host write monitoring mode based on determining that the trigger condition is satisfied, and wherein the die is identified and the command is sent during the host write monitoring mode.

Example 10 includes the host device of Example 9, wherein the indicator of the host write monitoring mode corresponds to a host flag in a command header sent to the flash memory device.

Example 11 includes the host device of any of Examples 1 to 10, wherein the command is sent responsive to detection of an idle condition associated with the flash memory device.

Example 12 includes the host device of Example 11, wherein the idle condition corresponds to one or more operative command queues being empty.

Example 13 includes the host device of any of Examples 1 to 12, wherein identification of the die of the flash memory device that has the higher data occupancy includes generation of a data occupancy value of each die of the flash memory device based on physical addresses in the L2P table.

Example 14 includes the host device of any of Examples 1 to 13, wherein the one or more processors are configured to send logical block addresses associated with the data to be moved.

Example 15 includes the host device of Example 14, wherein the one or more processors are configured to receive, from the flash memory device, updated physical block addresses associated with the logical block addresses after movement of the data to one or more destination dies of the flash memory device; and update the L2P table based on the updated physical block addresses.

According to Example 16, a method includes determining, at a host device coupled to a flash memory device, whether a trigger condition is satisfied, the trigger condition associated with checking a distribution of write data that is written to the flash memory device; and based on determining that the trigger condition is satisfied: identifying, at the host device, a die of the flash memory device that has a higher data occupancy than at least one other die of the flash memory device; and sending, at the host device, a command to the flash memory device to move data from the identified die to one or more other dies of the flash memory device.

Example 17 includes the method of Example 16, wherein movement of the data from the identified die to the one or more other dies improves write throughput via increased distribution of sequential write data across multiple dies of the flash memory device.

Example 18 includes the method of Example 16 or Example 17, wherein the trigger condition being satisfied indicates that, after completion of a sequence of data write operations to write the write data to the flash memory device, the write data was not evenly distributed among the dies of the flash memory device.

Example 19 includes the method of any of Examples 16 to 18, wherein determining whether the trigger condition is satisfied includes determining whether counts of the write operations to each respective destination die of the flash memory device indicate an uneven distribution of the write data among the dies of the flash memory device.

Example 20 includes the method of any of Examples 16 to 19, wherein determining whether the trigger condition is satisfied includes determining whether a time to perform sequential write operations exceeds a threshold time.

Example 21 includes the method of any of Examples 16 to 20, wherein determining whether the trigger condition is satisfied includes determining whether a count of sequential write operations to a single die exceeds a threshold count.

Example 22 includes the method of any of Examples 16 to 21, wherein determining whether the trigger condition is satisfied includes determining whether an elapsed time since a die occupancy detection operation was performed exceeds a threshold time interval.

Example 23 includes the method of any of Examples 16 to 22, wherein the command corresponds to a selective refresh operation supported by the flash memory device.

Example 24 includes the method of any of Examples 16 to 23, further comprising setting an indicator of a host write monitoring mode based on determining that the trigger condition is satisfied, and wherein the die is identified and the command is sent during the host write monitoring mode.

Example 25 includes the method of any of Examples 16 to 24, wherein the indicator of the host write monitoring mode corresponds to a host flag in a command header sent to the flash memory device.

Example 26 includes the method of any of Examples 16 to 25, wherein the command is sent responsive to detection of an idle condition associated with the flash memory device.

Example 27 includes the method of Example 26, wherein the idle condition corresponds to one or more operative command queues being empty.

Example 28 includes the method of any of Examples 16 to 27, wherein identifying the die of the flash memory device that has the higher data occupancy includes generating a data occupancy value of each die of the flash memory device based on physical addresses in a logical-to-physical address mapping table.

Example 29 includes the method of any of Examples 16 to 28, further comprising sending, to the flash memory device, logical block addresses associated with the data to be moved.

Example 30 includes the method of Example 29, further includes receiving, from the flash memory device, updated physical block addresses associated with the logical block addresses after movement of the data to one or more destination dies of the flash memory device; and updating a logical-to-physical address mapping table based on the updated physical block addresses.

According to Example 31, a non-transitory computer-readable medium storing instructions that, when executed by one or more processors of a host device coupled to a flash memory device, cause the one or more processors to determine whether a trigger condition is satisfied, the trigger condition associated with checking a distribution of write data that is written to the flash memory device; and based on a determination that the trigger condition is satisfied: identify a die of the flash memory device that has a higher data occupancy than at least one other die of the flash memory device; and send a command to the flash memory device to move data from the identified die to one or more other dies of the flash memory device.

Example 32 includes the non-transitory computer-readable medium of Example 31, wherein movement of the data from the identified die to the one or more other dies improves write throughput via increased distribution of sequential write data across multiple dies of the flash memory device.

Example 33 includes the non-transitory computer-readable medium of Example 31 or Example 32, wherein the trigger condition being satisfied indicates that, after completion of a sequence of data write operations to write the write data to the flash memory device, the write data was not evenly distributed among the dies of the flash memory device.

Example 34 includes the non-transitory computer-readable medium of any of Examples 31 to 33, wherein the instructions are executable to cause the one or more processors to evaluate whether the trigger condition is satisfied based on counts of the write operations to each respective destination die of the flash memory device indicating an uneven distribution of the write data among the dies of the flash memory device.

Example 35 includes the non-transitory computer-readable medium of any of Examples 31 to 34, wherein the instructions are executable to cause the one or more processors to evaluate whether the trigger condition is satisfied based on whether a time to perform sequential write operations exceeds a threshold time.

Example 36 includes the non-transitory computer-readable medium of any of Examples 31 to 35, wherein the instructions are executable to cause the one or more processors to evaluate whether the trigger condition is satisfied based on whether a count of sequential write operations to a single die exceeds a threshold count.

Example 37 includes the non-transitory computer-readable medium of any of Examples 31 to 36, wherein the instructions are executable to cause the one or more processors to evaluate whether the trigger condition is satisfied based on whether an elapsed time since a die occupancy detection operation was performed exceeds a threshold time interval.

Example 38 includes the non-transitory computer-readable medium of any of Examples 31 to 37, wherein the command corresponds to a selective refresh operation supported by the flash memory device.

Example 39 includes the non-transitory computer-readable medium of any of Examples 31 to 38, wherein the instructions are executable to cause the one or more processors to set an indicator of a host write monitoring mode based on determining that the trigger condition is satisfied, and wherein the die is identified and the command is sent during the host write monitoring mode.

Example 40 includes the non-transitory computer-readable medium of any of Examples 31 to 39, wherein the indicator of the host write monitoring mode corresponds to a host flag in a command header sent to the flash memory device.

Example 41 includes the non-transitory computer-readable medium of any of Examples 31 to 40, wherein the command is sent responsive to detection of an idle condition associated with the flash memory device.

Example 42 includes the non-transitory computer-readable medium of Example 41, wherein the idle condition corresponds to one or more operative command queues being empty.

Example 43 includes the non-transitory computer-readable medium of any of Examples 31 to 42, wherein identification the die of the flash memory device that has the higher data occupancy includes generation of a data occupancy value of each die of the flash memory device based on physical addresses in a logical-to-physical address mapping table.

Example 44 includes the non-transitory computer-readable medium of any of Examples 31 to 43, wherein the instructions are executable to cause the one or more processors to send, to the flash memory device, logical block addresses associated with the data to be moved.

Example 45 includes the non-transitory computer-readable medium of Example 44, wherein the instructions are executable to cause the one or more processors to receive, from the flash memory device, updated physical block addresses associated with the logical block addresses after movement of the data to one or more destination dies of the flash memory device; and update a logical-to-physical address mapping table based on the updated physical block addresses.

According to Example 46, an apparatus includes means for determining whether a trigger condition is satisfied, the trigger condition associated with checking a distribution of write data that is written to a flash memory device; means for identifying, based on determining that the trigger condition is satisfied, a die of the flash memory device that has a higher data occupancy than at least one other die of the flash memory device; and means for sending a command to the flash memory device to move data from the identified die to one or more other dies of the flash memory device.

Example 47 includes the apparatus of Example 46, wherein movement of the data from the identified die to the one or more other dies improves write throughput via increased distribution of sequential write data across multiple dies of the flash memory device.

Example 48 includes the apparatus of Example 46 or Example 47, wherein the trigger condition being satisfied indicates that, after completion of a sequence of data write operations to write the write data to the flash memory device, the write data was not evenly distributed among the dies of the flash memory device.

Example 49 includes the apparatus of any of Examples 46 to 48, wherein the means for determining whether the trigger condition is satisfied includes means for determining whether counts of the write operations to each respective destination die of the flash memory device indicate an uneven distribution of the write data among the dies of the flash memory device.

Example 50 includes the apparatus of any of Examples 46 to 49, wherein the means for determining whether the trigger condition is satisfied includes means for determining whether a time to perform sequential write operations exceeds a threshold time.

Example 51 includes the apparatus of any of Examples 46 to 50, wherein the means for determining whether the trigger condition is satisfied includes means for determining whether a count of sequential write operations to a single die exceeds a threshold count.

Example 52 includes the apparatus of any of Examples 46 to 51, wherein the means for determining whether the trigger condition is satisfied includes means for determining whether an elapsed time since a die occupancy detection operation was performed exceeds a threshold time interval.

Example 53 includes the apparatus of any of Examples 46 to 52, wherein the command corresponds to a selective refresh operation supported by the flash memory device.

Example 54 includes the apparatus of any of Examples 46 to 53, further comprising means for setting an indicator of a host write monitoring mode based on determining that the trigger condition is satisfied, and wherein the die is identified and the command is sent during the host write monitoring mode.

Example 55 includes the apparatus of any of Examples 46 to 54, wherein the indicator of the host write monitoring mode corresponds to a host flag in a command header sent to the flash memory device.

Example 56 includes the apparatus of any of Examples 46 to 55, wherein the command is sent responsive to detection of an idle condition associated with the flash memory device.

Example 57 includes the apparatus of Example 56, wherein the idle condition corresponds to one or more operative command queues being empty.

Example 58 includes the apparatus of any of Examples 46 to 57, wherein the means for identifying the die of the flash memory device that has the higher data occupancy includes means for generating a data occupancy value of each die of the flash memory device based on physical addresses in a logical-to-physical address mapping table.

Example 59 includes the apparatus of any of Examples 46 to 58, further comprising means for sending, to the flash memory device, logical block addresses associated with the data to be moved.

Example 60 includes the apparatus of Example 59, further includes means for receiving, from the flash memory device, updated physical block addresses associated with the logical block addresses after movement of the data to one or more destination dies of the flash memory device; and means for updating a logical-to-physical address mapping table based on the updated physical block addresses.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A host device comprising:
a memory configured to store a logical-to-physical address mapping (L2P) table of a flash memory device; and
one or more processors coupled to the memory and configured to be coupled to the flash memory device, wherein the one or more processors are configured to:
determine whether a trigger condition is satisfied, the trigger condition associated with checking a distribution of write data that is written to the flash memory device; and
based on a determination that the trigger condition is satisfied:
send a first command to the flash memory device to enable a host write monitoring mode;
identify a die among a plurality of dies of the flash memory device that has a higher data occupancy than at least one other die among the plurality of dies of the flash memory device; and
send a second command and logical block addresses associated with data stored at the identified die to the flash memory device to move the data from the identified die to one or more other dies of the plurality of dies of the flash memory device, wherein the second command corresponds to a refresh operation of the flash memory device that causes the flash memory device to distribute the logical block addresses among the plurality of dies of the flash memory device.

2. The host device of claim 1, wherein movement of the data from the identified die to the one or more other dies improves write throughput via increased distribution of sequential write data across multiple dies of the flash memory device.

3. The host device of claim 1, wherein the trigger condition being satisfied indicates that, after completion of a sequence of data write operations to write the write data to the flash memory device, the write data was not evenly distributed among the plurality of dies of the flash memory device.

4. The host device of claim 3, wherein the one or more processors are configured to evaluate whether the trigger condition is satisfied based on counts of the write operations to each respective destination die of the flash memory device indicating an uneven distribution of the write data among the plurality of dies of the flash memory device.

5. The host device of claim 1, wherein the one or more processors are configured to evaluate whether the trigger condition is satisfied based on whether a time to perform sequential write operations exceeds a threshold time.

6. The host device of claim 1, wherein the one or more processors are configured to evaluate whether the trigger condition is satisfied based on whether a count of sequential write operations to a single die exceeds a threshold count.

7. The host device of claim 1, wherein the one or more processors are configured to evaluate whether the trigger condition is satisfied based on whether an elapsed time since a die occupancy detection operation was performed exceeds a threshold time interval.

8. The host device of claim 1, wherein the second command corresponds to a selective refresh operation supported by the flash memory device.

9. The host device of claim 1, wherein the die is identified and the second command is sent during the host write monitoring mode.

10. The host device of claim 1, wherein the one or more processors are configured to set a host flag in a command header of the first command as an indicator of the host write monitoring mode.

11. The host device of claim 1, wherein the second command is sent responsive to detection of an idle condition associated with the flash memory device.

12. The host device of claim 11, wherein the idle condition corresponds to one or more operative command queues being empty.

13. The host device of claim 1, wherein identification of the die of the flash memory device that has the higher data occupancy includes generation of a data occupancy value of each die of the flash memory device based on physical addresses in the L2P table.

14. The host device of claim 1, wherein the one or more processors are configured to select the logical block addresses associated with the data to be moved from the identified die based on logical block address ranges identified in the L2P table as corresponding to the identified die.

15. The host device of claim 14, wherein the one or more processors are configured to:
receive, from the flash memory device, updated physical block addresses associated with the logical block addresses after movement of the data to be moved from the identified die to the one or more other dies of the flash memory device; and
update the L2P table based on the updated physical block addresses.

16. A method comprising:
determining, at a host device coupled to a flash memory device, whether a trigger condition is satisfied, the trigger condition associated with checking a distribution of write data that is written to the flash memory device; and
based on determining that the trigger condition is satisfied:
sending, from the host device, a first command to the flash memory device to enable a host write monitoring mode;
identifying, at the host device, a die among a plurality of dies of the flash memory device that has a higher data occupancy than at least one other die among the plurality of dies of the flash memory device; and
sending, at the host device, a second command and logical block addresses associated with data stored at the identified die to the flash memory device to move the data from the identified die to one or more other dies of the plurality of dies of the flash memory device, wherein the second command corresponds to a refresh operation of the flash memory device that causes the flash memory device to distribute the logical block addresses among the plurality of dies of the flash memory device.

17. The method of claim 16, wherein movement of the data from the identified die to the one or more other dies improves write throughput via increased distribution of sequential write data across multiple dies of the flash memory device.

18. The method of claim 16, wherein the trigger condition being satisfied indicates that, after completion of a sequence of data write operations to write the write data to the flash memory device, the write data was not evenly distributed among the plurality of dies of the flash memory device.

19. The method of claim 18, wherein determining whether the trigger condition is satisfied includes determining whether counts of the write operations to each respective destination die of the flash memory device indicate an uneven distribution of the write data among the plurality of dies of the flash memory device.

20. The method of claim 16, wherein determining whether the trigger condition is satisfied includes determining whether a time to perform sequential write operations exceeds a threshold time.

21. The method of claim 16, wherein determining whether the trigger condition is satisfied includes determining whether a count of sequential write operations to a single die exceeds a threshold count.

22. The method of claim 16, wherein determining whether the trigger condition is satisfied includes determining whether an elapsed time since a die occupancy detection operation was performed exceeds a threshold time interval.

23. The method of claim 16, wherein the second command corresponds to a selective refresh operation supported by the flash memory device.

24. The method of claim 16, wherein the die is identified and the second command is sent during the host write monitoring mode.

25. The method of claim 24, further comprising setting a host flag in a command header of the first command as an indicator of the host write monitoring mode.

26. The method of claim 16, wherein the second command is sent responsive to detection of an idle condition associated with the flash memory device.

27. A non-transitory computer-readable medium storing instructions that, when executed by one or more processors of a host device coupled to a flash memory device, cause the one or more processors to:
determine whether a trigger condition is satisfied, the trigger condition associated with checking a distribution of write data that is written to the flash memory device; and
based on a determination that the trigger condition is satisfied:
send a first command to the flash memory device to enable a host write monitoring mode;
identify a die of the flash memory device that has a higher data occupancy than at least one other die of the flash memory device; and
send a second command and logical block addresses associated with data stored at the identified die to the flash memory device to move the data from the identified die to one or more other dies of the flash memory device, wherein the second command corresponds to a refresh operation of the flash memory device that causes the flash memory device to distribute the logical block addresses among the one or more other dies of the flash memory device.

28. The non-transitory computer-readable medium of claim 27, wherein movement of the data from the identified die to the one or more other dies improves write throughput via increased distribution of sequential write data across multiple dies of the flash memory device.

29. An apparatus comprising:
means for determining whether a trigger condition is satisfied, the trigger condition associated with checking a distribution of write data that is written to a flash memory device;
means for sending a first command to the flash memory device, based on determining that the trigger condition is satisfied, to enable a host write monitoring mode;
means for identifying, based on determining that the trigger condition is satisfied, a die of the flash memory device that has a higher data occupancy than at least one other die of the flash memory device; and means for sending a second command and logical block addresses associated with data stored at the identified die to the flash memory device to move the data from the identified die to one or more other dies of the flash memory device, wherein the second command corresponds to a refresh operation of the flash memory device that causes the flash memory device to distribute the logical block addresses among the one or more other dies of the flash memory device.

30. The apparatus of claim 29, wherein movement of the data from the identified die to the one or more other dies improves write throughput via increased distribution of sequential write data across multiple dies of the flash memory device.

* * * * *